US008318029B1

(12) United States Patent
Kley

(10) Patent No.: US 8,318,029 B1
(45) Date of Patent: *Nov. 27, 2012

(54) METHODS OF MANUFACTURING DIAMOND CAPSULES

(75) Inventor: Victor B. Kley, Berkeley, CA (US)

(73) Assignee: Terraspan LLC, Dallas, TX (US)

( * ) Notice: Subject to any disclaimer, the term of this patent is extended or adjusted under 35 U.S.C. 154(b) by 1365 days.

This patent is subject to a terminal disclaimer.

(21) Appl. No.: 11/933,134

(22) Filed: Oct. 31, 2007

Related U.S. Application Data

(63) Continuation of application No. 11/067,600, filed on Feb. 25, 2005, now Pat. No. 7,309,446.

(60) Provisional application No. 60/623,283, filed on Oct. 28, 2004, provisional application No. 60/622,520, filed on Oct. 26, 2004, provisional application No. 60/602,413, filed on Aug. 17, 2004, provisional application No. 60/557,786, filed on Mar. 29, 2004, provisional application No. 60/554,690, filed on Mar. 19, 2004, provisional application No. 60/553,911, filed on Mar. 16, 2004, provisional application No. 60/552,280, filed on Mar. 10, 2004, provisional application No. 60/550,571, filed on Mar. 3, 2004, provisional application No. 60/547,934, filed on Feb. 25, 2004.

(51) Int. Cl.
*C25F 3/00* (2006.01)

(52) U.S. Cl. ............... 216/11; 216/39; 216/41; 216/54; 216/56; 216/65

(58) Field of Classification Search ............... 216/11, 216/39, 41, 54, 56, 65, 88
See application file for complete search history.

(56) References Cited

U.S. PATENT DOCUMENTS

| 2,177,928 A | 10/1939 | Knudsen |
| 2,970,905 A | 2/1961 | Doll |
| 3,491,423 A | 1/1970 | Haller |
| 3,599,307 A | 8/1971 | Campbell |

(Continued)

FOREIGN PATENT DOCUMENTS

EP 0 348 026 A1 12/1989

(Continued)

OTHER PUBLICATIONS

Angus et al. "Low-Pressure Metastable Growth of Diamond and 'Diamondlike Phases", Science, vol. 241, p. 913-921; Aug. 19, 1988.*

(Continued)

*Primary Examiner* — Binh X Tran
(74) *Attorney, Agent, or Firm* — Buchanan Ingersoll & Rooney PC

(57) ABSTRACT

Capsules and similar objects are made from materials having diamond ($sp^3$) lattice structures, including diamond materials in synthetic crystalline, polycrystalline (ordered or disordered), nanocrystalline and amorphous forms. The capsules generally include a hollow shell made of a diamond material that defines an interior region that may be empty or that may contain a fluid or solid material. Some of the capsules include access ports that can be used to fill the capsule with a fluid. Capsules and similar structures can be manufactured by growing diamond on suitably shaped substrates. In some of these methods, diamond shell sections are grown on substrates, then joined together. In other methods, a nearly complete diamond shell is grown around a form substrate, and the substrate can be removed through a relatively small opening in the shell.

17 Claims, 25 Drawing Sheets

U.S. PATENT DOCUMENTS

| | | | |
|---|---|---|---|
| 3,953,617 | A | 4/1976 | Smith et al. |
| 4,057,168 | A | 11/1977 | Bosshold |
| 4,150,089 | A | 4/1979 | Linet |
| 4,323,420 | A | 4/1982 | Masnari et al. |
| 4,380,855 | A | 4/1983 | Deckman et al. |
| 4,390,567 | A | 6/1983 | Liepins |
| 4,444,717 | A | 4/1984 | de Breze |
| 4,588,388 | A | 5/1986 | Chivari |
| 4,608,222 | A | 8/1986 | Brueckner |
| 4,637,520 | A | 1/1987 | Alvi |
| 4,732,364 | A | 3/1988 | Seger et al. |
| 4,790,735 | A | 12/1988 | Mayer |
| 4,886,177 | A | 12/1989 | Foster |
| 4,960,643 | A | 10/1990 | Lemelson |
| 4,987,002 | A | 1/1991 | Sakamoto et al. |
| 5,114,745 | A | 5/1992 | Jones |
| 5,602,439 | A | 2/1997 | Valone |
| 5,667,852 | A | 9/1997 | Kulik et al. |
| 5,680,008 | A | 10/1997 | Brandes et al. |
| 5,792,556 | A | 8/1998 | Ishikura et al. |
| 5,825,386 | A | 10/1998 | Ohashi |
| 5,858,477 | A | 1/1999 | Veerasamy et al. |
| 5,869,133 | A * | 2/1999 | Anthony et al. ........... 427/249.8 |
| 6,084,340 | A | 7/2000 | Bachmann et al. |
| 6,110,594 | A | 8/2000 | Pinneo |
| 6,144,028 | A | 11/2000 | Kley |
| 6,210,625 | B1 | 4/2001 | Matsushita et al. |
| 6,252,226 | B1 | 6/2001 | Kley |
| 6,261,469 | B1 | 7/2001 | Zakhidov et al. |
| 6,290,726 | B1 | 9/2001 | Pope et al. |
| 6,337,479 | B1 | 1/2002 | Kley |
| 6,339,217 | B1 | 1/2002 | Kley |
| 6,543,365 | B1 | 4/2003 | Vasel et al. |
| 6,596,395 | B1 | 7/2003 | Muramatsu |
| 6,652,732 | B2 | 11/2003 | Moulthrop et al. |
| 6,858,080 | B2 | 2/2005 | Linares et al. |
| 7,132,129 | B2 | 11/2006 | Van Enckevort et al. |
| 7,309,446 | B1 * | 12/2007 | Kley ................................ 216/11 |
| 2002/0014694 | A1 | 2/2002 | Olofsson |
| 2002/0050161 | A1 | 5/2002 | Warburton |
| 2002/0126289 | A1 | 9/2002 | Marquardt et al. |
| 2003/0205958 | A1 | 11/2003 | Schwind et al. |
| 2004/0071876 | A1 * | 4/2004 | Rakhimov et al. ......... 427/249.8 |
| 2004/0111159 | A1 * | 6/2004 | Pope et al. ................ 623/17.14 |
| 2004/0180205 | A1 | 9/2004 | Scarsbrook et al. |
| 2004/0219362 | A1 * | 11/2004 | Wort et al. .................... 428/408 |
| 2004/0234860 | A1 | 11/2004 | Qu et al. |
| 2004/0258603 | A1 | 12/2004 | Yakobson et al. |
| 2004/0258918 | A1 * | 12/2004 | Chaffin, III .................. 428/408 |
| 2006/0040104 | A1 | 2/2006 | Wort et al. |
| 2007/0104399 | A1 | 5/2007 | Hamza et al. |
| 2008/0256850 | A1 | 10/2008 | Kley |
| 2010/0297391 | A1 * | 11/2010 | Kley ............................ 428/141 |

FOREIGN PATENT DOCUMENTS

| | | |
|---|---|---|
| SU | 1045777 A | 12/1984 |
| TW | 399346 | 7/2001 |

OTHER PUBLICATIONS

Drory, M. D., "Performance of Diamond-Coated Silicon Nitride Bearings," Journal of Spacecraft, vol. 34, No. 5, pp. 683-684; article received Feb. 1, 1997.

Ali et al., *Implementation of the time-modulated process to produce diamond films using microwave-plasma and hot-filament CVD systems*, 71 Vacuum 445-450 (2003).

*Are We Really Made of Stars?*, High School Teacher Program 2008 CERN.

Artsimovich, Controlled Thermonuclear Reactions, 1-9 (1964).

*ASTM F2094 $Si_2N_4$ CERBEC Ball Specifications*, Saint-Gobain Ceramics, downloaded from: http://www.cerbec.com/techinfo/techspec.asp, Accessed Feb. 2, 2005.

Blatt et al., XIII: *Beta-Decay*, Theoretical Nuclear Physics 692 (1979).

Broad, *In Hot Pursuit of Fusion (or Folly)*, The New York Times: Science (May 25, 2009).

Colombant et al., *Sub-mega joule laser target designs for direct-drive ignition and moderate gains*, 47 Nuclear Fusion 17-22 (2007).

Datasheets: *Options and Accessories*, downloaded from: http://www.physikinstrumente.de/products/prdetail.php?secid=1-39, Accessed Feb. 2, 2005.

Diamond Materials GmbH, downloaded from www.diamond-materials.de, Accessed Aug. 24, 2008.

Drory, *Performance of Diamond-Coated Silicon Nitride Bearings*, 34(5) J. Spacecraft 683-684 (Feb. 1997).

*Germanium on silicon near infrared photodetectors*, Nonelinear Optics and Optoelectronics Lab, University Roma Tre (Italy), downloaded from: optow.ele.uniroma3.it/optow_2002/labs/SiGeNIRfiles/SiGeNIR.html, Accessed Feb. 8, 2005.

Heusch et al., *Systematics of carbon†carbon fusion-evaporation reactions*, 23(4) Physical Review C 1527-1535 (Apr. 1981).

How IFE Targets Work, downloaded from: http://www.nuc.berkeley.edu/thyd/icf/target.html, Accessed Aug. 25, 2011.

Kang et al., *Operation Frequence in a Triple-Walled Carbon-Nanotube Oscillator*, 49(4) Journal of the Korean Physical Society 1488-1492 (Oct. 2006).

Kilkenny et al., *A review of the ablative stabilization of the Rayleigh-Taylor instability in regimes relevant to inertial confinement fusion*, 1(5) Phys. Plasmas 1379-1389 (May 1994).

Kilkenny et al., *From One-of-a-Kind to 500,000 High Quality Ignition Targets Per Day*, 9 pages International Atomic Energy Agency 20th IAEA Fusion Energy Conference (Nov. 1-6, 2004).

King, *Crystal Structures and Lattice Parameters of Allotropes of the Elements*, 89 CRC Handbook of Chemistry and Physics 12-15 (2008-2009).

Komanduri, *Finishing of Silicon Nitride Balls*, downloaded from: http://www.asset.okstate.edu/asset/finish.html, Accessed Feb. 8, 2008.

Lawson, *Some Criteria for a Power Producing Thermonuclear Reactor*, 70 Proc. of the Phys. 6-10 (1957).

Lerche et al., *High Convergence, Indirect Drive Inertial Confinement Fusion Experiments at Nova*, 12th International Conference on Laser Interaction and Related Plasma Phenomena (Apr. 24-28, 1995).

Lindl, *Development of the indirect-drive approach to inertial confinement fusion and the target physics basis for ignition and gain*, 2(11) Phys. Plasmas 45 (Nov. 1995).

Lister, *Book Review: Fusion: The Energy of the Universe*, 48(5) Plasma Physics and Controlled Fusion 715-716 (2006.

London et al., *Thermal Infrared Exposure of Cryogenic Indirect Drive ICF Targets*, UCRL-JRNL-213603: Fusion Science and Technology (Jul. 14, 2005).

Lunn et al., *Growth of diamond films on spherical surfaces by hot filament CVD*, 7 Diamond and Related Materials 129-132 (1998).

Martinelli et al., *The Application of Semiconductors with Negative Electron Affinity Surfaces to Electron Emission Devices*, 62(10) Proc. IEEE 1339-1361 (1974).

Matzen et al., *Status and plans of the United States ICF Program*, 112 Journal of Physics: Conference Series 012001-0012004 (2008).

Mikhailovskii et al., *Charged Particle Autoemitter*, Translation into English of Fedorova et al. previously made of record by the USPTO Translation Branch.

Nakao et al., *Burn Characteristics of compressed fuel pellets for D-/sup 3/He inertial fusion*, 22(1) Fusion Technology 66-72 (Aug. 1992).

Padalino et al., *Direct and fusion carbon reaction components in the $^6Li$ †$^{12}C$ reaction at 30 MeV*, 35(5) Physical Review C 1692-1694 (May 1987).

Peterson et al., *Inertial Fusion Energy: A Tutorial on the Technology and Economics*, downloaded from: http://www.nuc.berkeley.edu/thyd/icf/IFE.html, Accessed Aug. 25, 2011.

Peterson et al., *Output Spectra from Direct Drive ICF Targets*, Presentation at Laser IFE Workshop, Naval Research Laboratory (May 31-Jun. 1).

*Pressure Vessels—Thin Wall Pressure Vessels*, University of Wisconsin—Stout—Statics and Strength of Material, (Physics 372-321), Topic 6.5, downloaded from: http://physics.uwstout.edu/statstr/Statics/index.htm, Accessed Feb. 8, 2005.

Sahoo et al., *Recoil tritium-C60 Interaction: a channel for endohedral encapsulation of tritium in C60*, 40 Carbon 2453-2460 (2002).

Stoldt et al., *Novel Low-Teperature CVD Process for Silicon Carbide MEMS*, Department of Chemical Engineering, University of California, Berkeley (2001).

Strieder et al., *Reaction data for light element nucleosynthesis*, 59 Progress in Particle and Nuclear Physics 562-578 (2007).

Sullivan et al., *Amorphous Diamond MEMS and Sensors*, Sandia National Laboratories Sand Report SAND2002-1755 (Jun. 2002).

*Summary Plasma Science Advancing Knowledge in the National Interest*, National Research Council of the National Academies i-xiv and 15-45 (May 2007).

Ting, *Diamond deposition on fine vapour grown carbon filament*, 30 Journal of Materials Science 4049-4058 (1995).

Wild et al., *Diamond spheres for tomorrow's energy*, downloaded from: http://www.fraunhofer.de/archiv/pi-en-2004-2008/EN/press/pi/2006/10/ResearchNews10s2006Topic3.html, Accessed Apr. 2008.

Williams, *Earth Fact Sheet*, NASA, last updated May 20, 2010.

Youngs, *Rayleigh-Taylor Instability: Numerical Simulation and Experiment*, 34(13) Plasma Physics Controlled Fusion 2071-2076 (1992).

Kley, U.S. Appl. No. 11/067,588, Diamond Structures as Fuel Capsules, filed Feb. 25, 2005.

Kley, U.S. Appl. No. 11/067,517, Diamond Capsules and Methods of Manufacture, filed Feb. 25, 2005.

Kley, U.S. Appl. No. 12/152,103, Diamond Capsules and Methods of Manufacture, filed May 10, 2008.

Kley, U.S. Appl. No. 11/067,521, Methods of Manufacturing Diamond Capsules, filed Feb. 25, 2005.

* cited by examiner

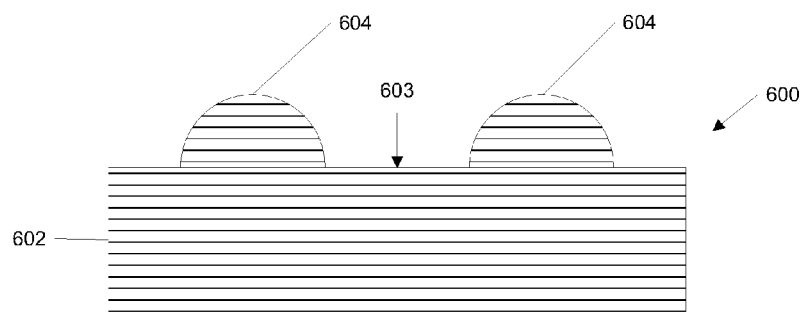
FIG. 6A
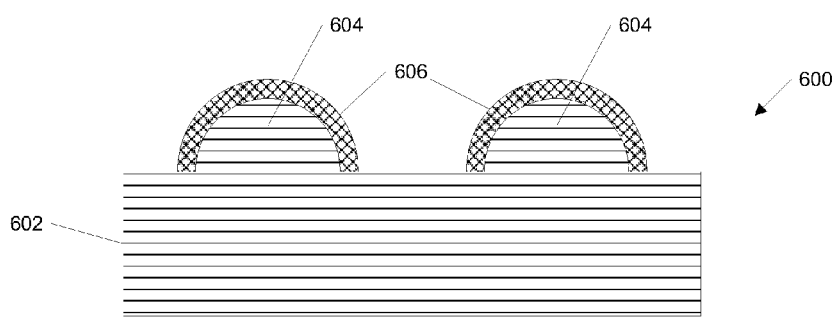
FIG. 6B
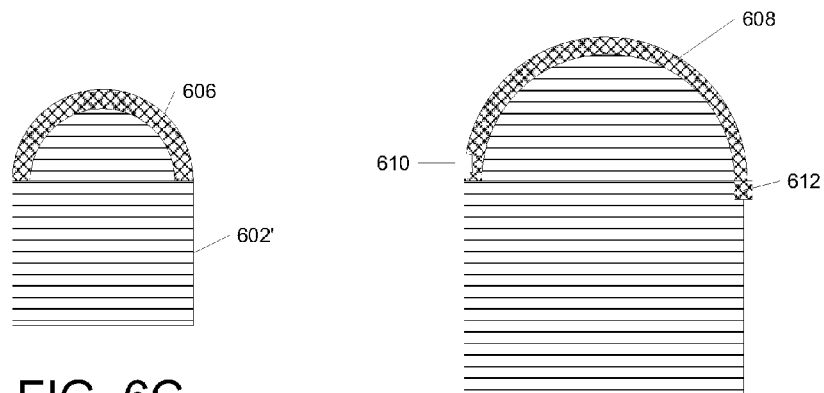
FIG. 6C
FIG. 6D

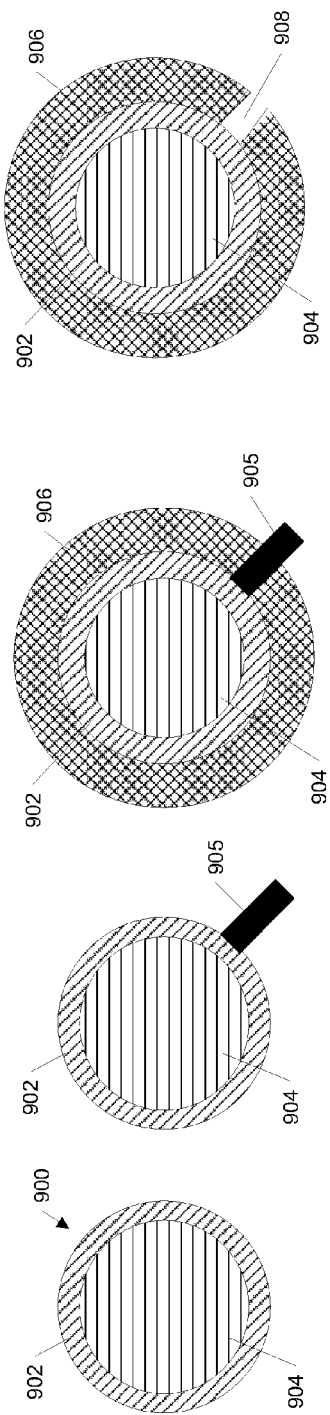
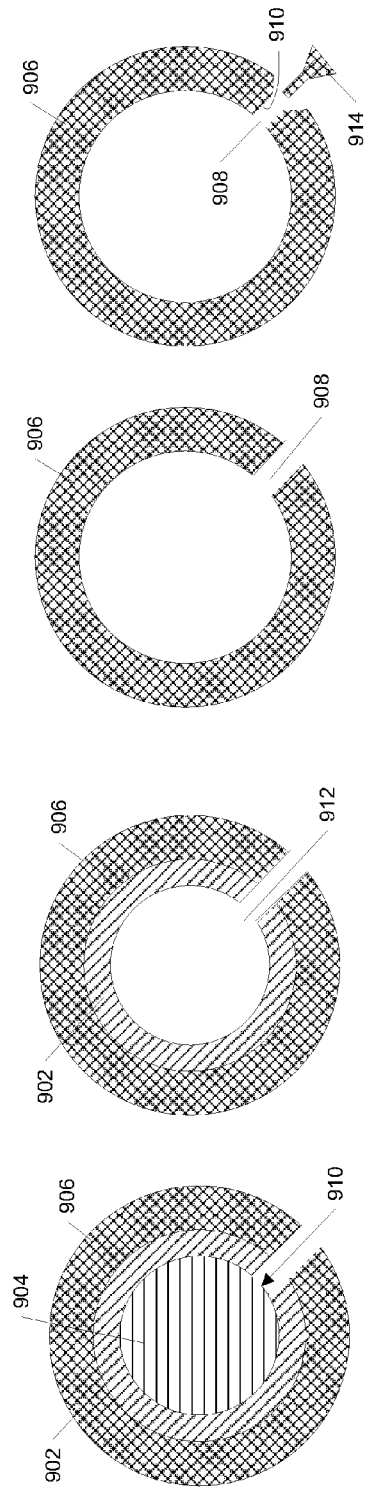
FIG. 9A FIG. 9B FIG. 9C FIG. 9D FIG. 9E FIG. 9F FIG. 9G FIG. 9H

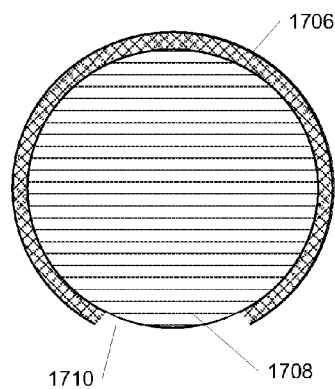
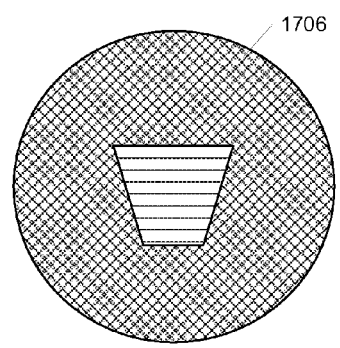
FIG. 17C  FIG. 17D
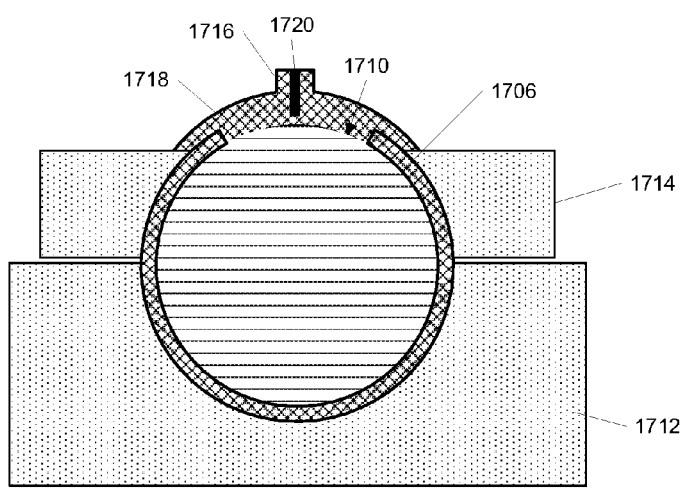
FIG. 17E

METHODS OF MANUFACTURING DIAMOND CAPSULES

CROSS REFERENCE TO RELATED APPLICATIONS

This application is a continuation of application Ser. No. 11/067,600, filed Feb. 25, 2005, entitled "Methods of Manufacturing Diamond Capsules," which disclosure is incorporated herein by reference for all purposes.

This application claims the benefit of the following nine U.S. Provisional Applications:
- U.S. Provisional Patent Application No. 60/547,934 filed Feb. 25, 2004, entitled "Diamond Molding of Small and Microscale Capsules";
- U.S. Provisional Patent Application No. 60/550,571 filed Mar. 3, 2005, entitled "Diamond Molding of Small and Microscale Capsules";
- U.S. Provisional Patent Application No. 60/552,280 filed Mar. 10, 2005, entitled "Diamond Molding of Small and Microscale Capsules";
- U.S. Provisional Patent Application No. 60/553,911 filed Mar. 16, 2005, entitled "Diamond Molding of Small and Microscale Capsules";
- U.S. Provisional Patent Application No. 60/554,690 filed Mar. 19, 2004, entitled "Diamond and/or Silicon Carbide Molding of Small and Microscale or Nanoscale Capsules and Hohlraums";
- U.S. Provisional Patent Application No. 60/557,786 filed Mar. 29, 2004, entitled "Diamond and/or Silicon Carbide Molding of Small and Microscale or Nanoscale Capsules and Hohlraums";
- U.S. Provisional Patent Application No. 60/602,413 filed Aug. 17, 2004, entitled for "Diamond and/or Silicon Carbide Molding of Small and Microscale or Nanoscale Capsules and Hohlraums";
- U.S. Provisional Patent Application No. 60/622,520 filed Oct. 26, 2004, entitled "Diamond and/or Silicon Carbide Molding of Small and Microscale or Nanoscale Capsules and Hohlraums"; and
- U.S. Provisional Patent Application No. 60/623,283 filed Oct. 28, 2004, entitled "Diamond and/or Silicon Carbide Molding of Small and Microscale or Nanoscale Capsules and Hohlraums."

The respective disclosures of these applications, including any attachments and appendices thereto, are incorporated herein by reference for all purposes.

The following U.S. patents and patent applications, including any attachments and appendices thereto, are also incorporated herein by reference for all purposes:
- U.S. Pat. No. 6,144,028 issued Nov. 7, 2000, entitled "Scanning Probe Microscope Assembly and Corresponding Method for Making Confocal, Spectrophotometric, Near-Field, and Scanning Probe Measurements and Forming Associated Images from the Measurements";
- U.S. Pat. No. 6,252,226, issued Jun. 26, 2001, entitled "Nanometer Scale Data Storage Device and Associated Positioning System";
- U.S. Pat. No. 6,337,479, issued Jan. 8, 2002, entitled "Object Inspection and/or Modification System and Method";
- U.S. Pat. No. 6,339,217, issued Jan. 15, 2002, entitled "Scanning Probe Microscope Assembly and Method for Making Spectrophotometric, Near-Field, and Scanning Probe Measurements";
- U.S. Provisional Application No. 60/554,194, filed Mar. 16, 2004, entitled "Silicon Carbide Stabilizing of Solid Diamond and Stabilized Molded and Formed Diamond Structures";
- U.S. patent application Ser. No. 11/067,517, filed Feb. 25, 2005, entitled "Diamond Capsules and Methods of Manufacture";
- U.S. patent application Ser. No. 11/067,521, filed Feb. 25, 2005, entitled "Methods of Manufacturing Diamond Capsules"; and
- U.S. patent application Ser. No. 11/067,609, filed Feb. 25, 2005, entitled "Apparatus for Modifying and Measuring Diamond and other Workpiece Surfaces with Nanoscale Precision."

RELATED DOCUMENTS INCORPORATED BY REFERENCE

The following documents provide background information related to the present application and are incorporated herein by reference:

[KOMA] R. Komanduri et al., "Finishing of Silicon Nitride Balls," Oklahoma State University, Web Page at asset (dot) okstate (dot) edu (slash) asset (slash) finish.htm (updated Aug. 21, 2003);

[PHYS] Physik Instrumente (PI) GmbH, "Datasheets: Options and Accessories," Web page at www (dot) physikinstrumente (dot) de (slash) products (slash) prdetail.php?secid=1-39;

[NOOL] Nonlinear Optics and Optoelectronics Lab, University Roma Tre (Italy), "Germanium on Silicon Near Infrared Photodetectors," Web page at optow (dot) ele (dot) uniroma3 (dot) it (slash) optow_2002 (slash) labs (slash) SiGeNIR files (slash) SiGeNIR.htm;

[SAIN] Saint-Gobain Ceramics, "ASTM F2094 $Si_3N_4$ Cerbec Ball Specifications," Web page at www (dot) cerbec (dot) com (slash) TechInfo (slash) TechSpec.asp;

[STOL] C. R. Stoldt et al., "Novel Low-Temperature CVD Process for Silicon Carbide MEMS" (preprint), C. R. Stoldt, C. Carraro, W. R. Ashurst, M. C. Fritz, D. Gao, and R. Maboudian, Department of Chemical Engineering, University of California, Berkeley;

[SULL] J. P. Sullivan et al., "Amorphous Diamond MEMS and Sensors," Sandia National Labs Report SAND2002-1755 (2002); and

[UWST] University of Wisconsin—Stout—Statics and Strength of Material, (Physics 372-321), Topic 6.5:Pressure Vessels—Thin Wall Pressure Vessels, Web page at physics (dot) uwstout (dot) edu (slash) StatStr (slash) Statics (slash) index.htm.

Copies of these documents have been made of record in the present application.

BACKGROUND OF THE INVENTION

The present invention relates in general to mechanical structures such as capsules, pellets, ball bearings and the like, and in particular to diamond capsules and methods of manufacture.

Ball bearings are usually made of metal or ceramic materials that can be finished to a surface smoothness with deviations on the order of a few nanometers (nm). Standard methods for making ball bearings include using a stamping machine to cut a ball from a wire of metal or ceramic material, then rolling the ball between plates to smooth over the rough edges left from the stamping procedure.

For other applications, hollow capsules are made from glass microballoons or from hollow cylindrical wires, in much the same fashion as ball bearings. Surface roughness or smoothness is imposed by laser ablation. Surface deviations are typically on the order of many nanometers, and deviations from spherical shape are on the order of a hundred nanometers to a micron.

Capsules are also sometimes made by manufacturing sections (e.g., hemispherical shell sections), then joining or welding the sections together at their peripheral edges. Conventional machining techniques are then used to bring the surface to the requisite shape and smoothness.

Current technology does not provide materials or processes capable of shaping and smoothing ball bearings or capsules to sub-nanometer precision. In addition, current materials are not suited for use at extreme temperatures (e.g. near absolute zero and/or above 100 K), or where extreme demands are placed on the strength and uniformity of the ball bearing or capsule. In addition, current methods for making ball bearings, capsules and similar structures generally do not provide the ability to form complex structures or to incorporate specific electromagnetic properties into the capsule.

It would therefore be desirable to provide improved materials and methods for manufacturing ball bearings, capsules, and similar structures.

BRIEF SUMMARY OF THE INVENTION

Embodiments of the present invention provide capsules and similar objects made from diamond materials, including crystalline, polycrystalline (ordered or disordered), nanocrystalline and amorphous diamond. "Diamond" refers generally to any material having a diamond lattice structure on at least a local scale (e.g., a few nanometer), and the material may be based on carbon atoms, silicon atoms, silicon carbide or any other atoms capable of forming a diamond lattice. The capsules generally include a hollow shell of a diamond material that defines an interior region made of some other material; the interior region may be empty or may contain a fluid or solid material. Other embodiments of the invention provide methods for manufacturing capsules and similar structures using synthetic diamond.

According to one aspect of the present invention, a fabricated diamond capsule is provided. The diamond may be carbon based diamond or may be based on other types of atoms. The capsule may be of any form of diamond. The diamond may be crystalline diamond, polycrystalline diamond, polycrystalline oriented diamond, polycrystalline disoriented diamond, nanocrystalline diamond, or amorphous diamond.

According to another aspect of the present invention, a capsule has a shell made of a synthetic diamond material. The shell has an inner wall that defines an interior region of the capsule. The interior region can be substantially empty, or it can be filled with a fluid; the fluid may be a gas, a liquid, or a collection of particles (e.g., dust) that exhibits fluidic behavior. The interior region can also be wholly or partially filled with a solid material.

In some embodiments, the diamond material, which may be carbon-based diamond or diamond based on some other atom type(s), consists essentially of one diamond crystal. In other embodiments, the diamond material consists essentially of a plurality of diamond crystal grains, and the crystal grains may be nanoscale grains, e.g., with an average value of a major axis of the diamond crystal grains of about 100 nm or less. The grains might or might not have a preferred orientation. In still other embodiments, the diamond material consists essentially of amorphous diamond.

The size and thickness of the shell may be varied. For instance, in some embodiments, the shell may have a major axis with a length between about 20 microns and about 1 meter.

In some embodiments, the shell can be substantially spherical. An inner surface and an outer surface of the spherical shell can be smooth such that the capsule is usable as a ball bearing. For instance, in one embodiment, local deviations from smoothness on the inner surface of the shell are less than about 4 nm, and in another embodiment, local deviations from smoothness on the outer surface of the shell are less than about 4 nm In some embodiments, the interior region contains a ball shaped form. The ball shaped form can be hollow, or it can substantially fill the interior region. The ball shaped form may be made of a substrate material for growing diamond and can in fact be used for growing the diamond material of the shell. For example, a ball shaped form can be made of, or coated with, any material selected from the group consisting of silicon, silicon carbide, silicon nitride, silicon dioxide (including quartz), titanium, titanium carbide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, any suitable glass, and aluminum oxide (including alumina).

In some embodiments, the shell has an access port therethrough. A valve can be disposed in the shell and adapted to prevent a fluid within the capsule from escaping through the access port when the valve is closed. For instance, the valve may include a deformable flap of material or a displaceable tapered filament, with a tapered section at an outer end of the filament having a slot therein.

In other embodiments, the interior region of the capsule is filled with a fluid, and the fluid may be at a high pressure relative to an external pressure on the shell.

In still other embodiments, the diamond material includes a dopant, such as boron or nitrogen or other dopants, including but not limited to astatine, polonium, americium, antimony, bismuth, arsenic, germanium, iodine, tellurium, selenium, silicon, or bromine.

The dopant has various uses. For instance, the dopant may increase an electrical conductivity of the diamond material. The dopant can be disposed nonuniformly in the diamond material such that a first region of the shell has a higher electrical conductivity than a second region of the shell. In some embodiments, an access port is located in the first region of the shell.

In further embodiments, a layer of a coating material is disposed on an outer wall of the shell. The coating layer may have small thickness variations that form a capsule identification pattern. Various coating materials can be used, including silicon, germanium, silicon carbide, silicon dioxide (including quartz), silicon fluoride, magnesium fluoride, silicon nitride, titanium, titanium carbide, titanium dioxide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, chromium oxide, and aluminum oxide (including alumina).

According to another aspect of the present invention, a hemispherical diamond shell section has substantially concentric inner and outer walls.

According to still another aspect of the present invention, a capsule has at least two shell sections, each shell section made of a diamond material. For example, a capsule may be made from two substantially hemispherical shell sections. The shell sections can be connected in various ways. For instance, shell sections can be connected by complementary latch members located near respective peripheral edges of the shell sections, or by an interference member located near a peripheral edge of one of the shell sections.

In other embodiments, the shell sections are connected by a bonding material disposed between respective peripheral edge surfaces of the adjacent shell sections. The bonding material generally includes one or more layers of different materials. For instance, in one embodiment the bonding material comprises silicon and spin on glass. In another embodiment, the bonding material comprises a noble gas at a low temperature.

According to a further aspect of the present invention, a method for making a capsule is provided. A plurality of shell sections made of a diamond material are aligned and joined together at respective peripheral edges thereof to form a capsule shell.

In some embodiments, each shell section may consist essentially of a single diamond crystal, and the sections may be substantially planar. In other embodiments, the diamond material is a polycrystalline, nanocrystalline or amorphous diamond material, and each of the shell sections can be substantially hemispherical. Other numbers and shapes of shell sections may be substituted.

A number of techniques for joining diamond shell sections are disclosed. For example, shell sections can be joined in a low temperature environment. In that environment, respective peripheral edges of the shell sections are held in proximity to each other such that a joint area is defined, and a noble gas is supplied to the joint area via a heated passage. The low temperature is sufficiently low that the noble gas condenses in the joint area.

As another example, shell sections can also be processed, e.g., by machining, molding, chemically modifying, polishing, lapping, or grinding the shell sections, to form complementary latch or interference members therein, and the act of joining may include aligning the shell sections such that the complementary latch or interference members engage.

As a third example, shell sections can be joined by creating a temperature difference between two shell sections such that one of the shell sections is warmer than the other, overlapping a peripheral edge of the warmer one of the shell sections with a peripheral edge of the other one of the shell sections, and reducing the temperature difference while holding the shell sections in overlapping relation to each other.

As a fourth example, shell sections are joined by applying a bonding agent to a peripheral edge of at least one of the shell sections, then holding the peripheral edge with the bonding agent in contact with a peripheral edge of another shell section so that a bond forms. Applying the bonding agent may include applying multiple materials, e.g., an adhesion layer, a coupling layer, and a bondable layer. Applying the bonding agent may also include applying a silicon sputter and a spin on glass.

The act of joining can be performed in a fluid environment such that the capsule shell contains the fluid. Alternatively, an access port through the shell can be created, and the capsule can be filled with a fluid (e.g., a gas) via the access port.

Shell surfaces can be processed, e.g., by machining, chemically modifying, polishing, lapping, or grinding a surface of the shell.

In some embodiments, a layer of a coating material is applied to an exterior surface of the capsule. The coating layer can have small variations in thickness that provide a capsule identifier. Various coating materials may be used, including silicon, germanium, silicon carbide, silicon dioxide (including quartz), silicon fluoride, magnesium fluoride, silicon nitride, titanium, titanium dioxide, titanium carbide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, chromium oxide, or aluminum oxide (including alumina).

According to a still further aspect of the present invention, a method for making a capsule is provided. Diamond material is grown on a mold substrate, thereby forming a plurality of shell sections. The shell sections are then joined together to form a capsule shell.

A variety of diamond materials can be grown, including polycrystalline or nanocrystalline diamond, with or without a preferred orientation for the crystal grains, as well as amorphous diamond. The shell sections can be substantially hemispherical or can have other shapes. In one embodiment with hemispherical shell sections, local deviations from smoothness on a surface of the shell section are less than about 4 nm.

To impart shape to the shell sections, the mold substrate can include a plurality of surface features, each surface feature conforming to a shell section shape, and the diamond material can be grown over the surface features such that the diamond material conforms to the surface features. For example, a surface feature can be convex and substantially hemispherical, concave and substantially hemispherical, or some other desired shape. Some of the surface features may also define latch or interference members for the shell sections.

In some embodiments, a surface or edge of one or more of the shell sections may be machined, chemically modified, polished, lapped, or ground to impart a desired characteristic thereto.

Mold substrates can be made of or coated with any material on which diamond can be grown, including but not limited to silicon, silicon carbide, silicon nitride, silicon dioxide (including quartz), titanium, titanium carbide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, any suitable glass, and aluminum oxide (including alumina). After diamond growth, the shell sections can be removed from the mold substrate, e.g., by wet or dry etching of the mold substrate material.

A variety of growth processes may be used to grow diamond material. Examples include a chemical vapor deposition process, a plasma enhanced chemical vapor deposition process, a hot wire diamond growth process, or a laser induced amorphous diamond growth process.

In some embodiments, a dopant may be introduced into the diamond material during the growing step. Examples of suitable dopants include but are not limited to astatine, polonium, americium, antimony, bismuth, arsenic, germanium, iodine, tellurium, selenium, silicon, and bromine. In other embodiments, at least a portion of the diamond material may be coated or implanted with one or more other materials. For example, at least a portion of the diamond material can be coated with silicon, or at least a portion of the diamond material can be implanted with germanium. Other examples of coating or implanting material include silicon carbide, silicon dioxide (including quartz), silicon fluoride, magnesium fluoride, silicon nitride, titanium, titanium carbide, titanium dioxide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, chromium oxide, or aluminum oxide (including alumina).

Coating or implanting can be performed at various stages during diamond growth. For instance, coating or implanting can be performed after growing the layer to a thickness of about 50 microns, or after growing the layer to a thickness of about 5% of a radius of a major axis of an intended shape of the capsule. After coating or implanting, growth of the diamond material can be resumed. Where appropriate, the surface of the material can be reseeded prior to resuming growing of the diamond material.

Other aspects of the invention relate to growing diamond shells over a form substrate, where the diamond shell covers most or all of the substrate. According to one such aspect, in a method for making a capsule, a substantially spherical shell of a diamond material is grown over a substantially spherical form substrate such that the shell covers most or all of the form substrate. The spherical form substrate can be very smooth; for instance, local deviations from smoothness on a surface of the shell section may be less than 4 nm. After growing the shell, a portion of the shell comprising at most 50% of the shell area is removed, thereby creating an opening in the shell, and the form substrate is removed through the opening.

According to another aspect of the present invention, in a method for making a capsule, a shell of a diamond material is grown over a form substrate such that the shell covers all of the form substrate. An opening through the shell is formed, and the form substrate is removed through the opening. The opening advantageously comprises at most 50% of the shell area.

According to yet another aspect of the present invention, in a method for making a capsule, a shell of a diamond material is grown over a form substrate such that the shell covers most of the form substrate. The substrate is removed through an opening in the shell. An access port and a valve member are formed in the shell, with the valve member being operable to open or close the access port.

Access ports can be formed in various ways. In some embodiments, one or more pins are held in contact with the form substrate while growing the shell. After growing the shell, the one or more pins are separated from the form substrate, thereby opening the access port. For example, each pin might include a tube of a material different from the diamond material of the shell, and separating the one or more pins may include etching the tube material. A pin can also be held in contact with the form substrate during the act of growing such that an access port with a deformable flap is formed in the shell and removing the pin after the act of growing; the valve member includes the deformable flap.

In still another embodiment, the access port and the valve member are formed by a process that includes holding a first structure in contact with the form substrate during a first phase of the act of growing such that an opening in the shell is created. After the first phase, the first structure is replaced with a second structure and a second phase of the act of growing is performed. The second structure substantially covers and extends beyond the opening in the shell created by the first structure.

In still another embodiment, the access port and the valve member are formed by a process that includes coating a tapered filament made of the diamond material with a material other than the diamond material. An end of the coated filament is held in contact with the form substrate during the act of growing the shell. After the act of growing the shell, the coating is removed from the filament, and after removal of the coating, the filament is displaceably held in the shell and operable as the valve member.

In some embodiments, the capsule is filled with a fluid via the access port. For example, the capsule may be placed into an environment containing the fluid at a high pressure until a pressure equilibrium is reached between the capsule and the environment. Thereafter, the capsule environment can be modified such that the pressure of the fluid on the valve member closes the access port.

According to still another aspect of the invention, in a method of making a capsule, a shielding member is placed over a portion of a form substrate. A diamond material is grown over the form substrate with the shielding member in place, thereby forming a shell with an opening therein. The shielding member is removed to expose the shielded portion of the form substrate, and the form substrate is removed through the opening in the shell. In some embodiments, the opening comprises at most 50% of the shell area.

In some embodiments, particularly where the opening is relatively large, prior to removing the form substrate, a cap member of the diamond material but distinct from the shell is formed over the exposed portion of the form substrate. The cap member is then removed from the shielded portion of the form substrate. After removing the form substrate through the opening, the cap member is replaced and additional diamond material is grown over the shell and the cap member. To form the cap member, the shell may be placed in a shielding holder such that the opening is exposed. A release coating is applied over the opening, and the diamond material is grown over the release coating to form the cap member.

In some embodiments that use a cap member, a tube member made of a material other than the diamond material may be held in contact with the exposed portion of the form substrate while growing the cap material. After growing the cap material, the tube member is removed, thereby forming an access port for the capsule.

According to a still further aspect of the present invention, in a method of making a capsule, a tube member made of a tube material different from a diamond material is provided. An end of the tube member is placed contact with a form substrate. A diamond material is grown over the form substrate with the tube member in place, thereby forming a shell. The tube member is then removed to provide an access port to the interior of the shell. A portion of the shell comprising at most 50% of the shell area can be removed to create an opening in the shell, with the removed portion not including the tube member or the access port, and the form substrate can be removed through the opening in the shell.

In some embodiments, the capsule is filled with a fluid via the access port, then filled in. For instance, the capsule can be placed into an environment containing the fluid at a high pressure and a pressure equilibrium reached between the capsule and the environment. Thereafter, the access port can be filled in while the environment is maintained at a lower pressure than the high pressure.

To fill in the access port in one embodiment, at least a portion of a surface defining the access port is charged relative to the rest of the capsule such that diamond growth in the access port is promoted, then diamond material is grown in the access port. Prior to applying the charge, a dopant can be added to at least a portion of the shell, and the act of charging includes charging the portion of the shell where the dopant was added. Alternatively, the growth temperature can be lowered and the temperature of the shell adjusted such that diamond growth is promoted toward the inner end of the access port. In yet another embodiment, the access port is filled in by inserting a plug into the access port.

In any of the above methods, the diamond material that is grown can be a polycrystalline diamond material comprising a plurality of crystal grains. The material can be nanocrystalline, with an average value of a major axis of the crystal grains being about 100 nm or less. The diamond material can also be amorphous diamond.

In any of the above methods, the diamond material can be a carbon based diamond material, and the material may be grown by various processes, including a chemical vapor deposition process, a plasma enhanced chemical vapor deposition process, a hot wire diamond growth process, or a laser induced amorphous diamond growth process.

In any of the above methods, a surface of the form substrate may be machined, chemically modified, polished, lapped, or ground to a desired shape prior to the act of growing. During diamond growth, the inner surface of the diamond shell will conform to the surface of the form substrate. Similarly, after the act of growing, a surface of the shell may be machined, chemically modified, polished, lapped, or ground to a desired shape.

In any of the above methods, the form substrate is advantageously made of or coated with a material suited for growing diamond. Suitable materials include but are not limited to silicon, silicon carbide, silicon nitride, silicon dioxide (including quartz), titanium, titanium carbide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, any suitable glass, or aluminum oxide (including alumina).

In any of the above methods, the form substrate can be substantially spherical, and the resulting shell may also be substantially spherical. In one embodiment, local deviations from smoothness on an outer surface of the form substrate are less than about 4 nm.

In any of the above methods, a dopant may be introduced into the diamond material during the act of growing the shell. Examples of suitable dopants include astatine, polonium, americium, antimony, bismuth, arsenic, germanium, iodine, tellurium, selenium, silicon, or bromine; other dopants may also be used.

In any of the above methods, at least a portion of the shell may be coated or implanted with one or more materials. For example, at least a portion of the shell may be coated with silicon, or at least a portion of the shell may be implanted with germanium. Other examples of coating or implanting materials include silicon carbide, silicon dioxide (including quartz), silicon fluoride, magnesium fluoride, silicon nitride, titanium, titanium dioxide, titanium carbide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, chromium oxide, or aluminum oxide (including alumina).

Coating or implanting may be performed at any point during shell growth. For instance, in one embodiment, coating or implanting is performed after growing the shell to a thickness of about 50 microns; in another embodiment, coating or implanting is performed after growing the shell to a thickness of about 5% of a radius of a major axis of the form substrate. After coating or implanting, growing of the shell may be resumed; the shell surface can be reseeded prior to resuming growing of the shell.

In any of the above methods where the form substrate is removed, removing the form substrate may include wet or dry etching of the form substrate material.

Access ports usable to transport a fluid to an interior of the capsule in connection with any of the above methods. In one embodiment, creating the access port includes using an energetic beam of charged particles, a laser, or machining. In another embodiment, the shell is coated with an etch resist that is patterned to define a location of the access port. The shell is etched at the location of the access port to create an opening through the shell. In another embodiment, one or more pins can be held in contact with the form substrate while the shell is being grown. After growing the shell, the one or more pins are separated from the form substrate, thereby opening the access port. Where the pins include a tube of a material different from the diamond material of the shell, separating the pins from the form substrate can include etching the tube material.

Where an access port is provided, the capsule can be filled with a fluid via the access port and the access port filled in. For example, the capsule can be placed into an environment containing the fluid at a high pressure and allowed to reach a pressure equilibrium with the environment. Thereafter, the access port can be filled in. In one embodiment, at least a portion of a surface defining the access port is charged relative to the rest of the capsule such that diamond growth in the access port is promoted, and the diamond material is grown in the access port. Where a dopant is added at least a portion of the shell, charging can include charging the portion of the shell where the dopant was added. In another embodiment, the access port can be filled in by lowering the growth temperature and adjusting the temperature of the shell such that diamond growth is promoted toward the inner end of the access port. In yet another embodiment, the access port is filled by inserting a plug into the access port.

Where an access port is provided, a valve can also be formed in the shell, the valve being operable to open or close the access port. Valves can be formed in various ways. In one embodiment, a pin is held in contact with the form substrate during the act of growing such that a deformable lip is formed in the shell, and the deformable lip operates as the valve. In another embodiment, a first structure is held in contact with the form substrate during a first phase of growing the shell, such that an opening in the shell is created. After the first phase, the first structure is replaced with a second structure and a second phase of shell growing is performed; the second structure substantially covers and extends beyond the opening in the shell created by the first structure. In still another embodiment, a tapered filament made of the diamond material is coated with a material other than the diamond material. An end of the coated filament is held in contact with the form substrate during growth of the shell. After the shell is grown, the coating is removed from the filament. With the coating removed, the filament is displaceably captive in the shell and operates as the valve.

Where a valve is provided, the capsule can be filled with a fluid, and the capsule environment then modified such that the pressure of the fluid on the valve closes the access port.

Still other aspects of the invention relate to manufacturing techniques that can be employed with parts having a variety of material compositions, including but not limited to diamond capsules. For example, according to one such aspect of the present invention, a method for creating a part having sections includes using a noble gas at a low temperature as an adhesive for joining the sections of the part. The noble gas is advantageously in a liquid or solid state at the low temperature; for instance, neon can be used at temperatures below about 24 K.

According to another aspect of the invention, a method of filling a capsule (such as a diamond capsule) with a fluid includes placing a capsule into an environment containing the fluid and maintaining the environment at a suitable temperature and pressure to induce diffusion of the gas into an interior region of the capsule. The temperature of the capsule or the environment can be altered so as to control a pressure of the fluid within the capsule. A pressure of the fluid within the capsule can be controlled by controlling a time period during which diffusion of the fluid takes place. After a period of time, the environment may be modified to a different temperature and/or pressure such that diffusion of the fluid out of the capsule is inhibited.

According to another aspect of the invention, a bearing includes a shell made of a diamond material, an outer surface of the shell being shaped to provide parallel ridges. The shell may be, for example, a polycrystalline, nanocrystalline, or amorphous diamond material, and may be made of carbon or other types of diamond. The diamond may also be doped with other materials.

The bearing can have a variety of sizes; for example, a major axis of the shell may have a length between about 20 microns and about 1 meter.

An interior of the shell may be hollow, or it may be substantially filled with a solid material. The solid material filling the interior may include an outer layer of a material on which diamond can be grown, such as silicon, silicon carbide, silicon nitride, silicon dioxide (including quartz), titanium, titanium carbide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, any suitable glass, and aluminum oxide (including alumina).

A coating material may be applied over the shell. Examples of suitable coating materials include silicon, germanium, silicon carbide, silicon dioxide (including quartz), silicon fluoride, magnesium fluoride, silicon nitride, titanium, titanium dioxide, titanium carbide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, chromium oxide, or aluminum oxide (including alumina).

The following detailed description together with the accompanying drawings will provide a better understanding of the nature and advantages of the present invention.

BRIEF DESCRIPTION OF THE DRAWINGS

FIGS. 6A-6M are cross-sectional views of capsule structures at various stages of the process of FIG. 5;

FIGS. 9A-9H are cross-sectional views of a capsule structure at various stages of the process of FIG. 8;

FIGS. 17A-17F are perspective and cross-sectional views of a capsule and support structures at various stages of a process for forming a capsule according to another embodiment of the present invention.

DETAILED DESCRIPTION OF THE INVENTION

Embodiments of the present invention provide capsules and similar objects made from diamond materials, including crystalline, polycrystalline (ordered or disordered), nanocrystalline and amorphous diamond. "Diamond" refers generally to any material having a diamond lattice structure on at least a local scale (e.g., a few nanometer), and the material may be based on carbon atoms, silicon atoms, silicon carbide or any other atoms capable of forming a diamond lattice. The capsules generally include a hollow shell of a diamond material that defines an interior region made of some other material; the interior region may be empty or may contain a fluid or solid material. Other embodiments of the invention provide methods for manufacturing capsules and similar structures using synthetic diamond.

I. Diamond Capsule Structures

A. Capsule Shell

As used herein, the term "capsule" refers to any three dimensional object having a shell with an identifiable inner wall that substantially encloses an interior region. The interior region may be empty, or it may be filled with some material, including solid or fluid materials.

Figure 1A:
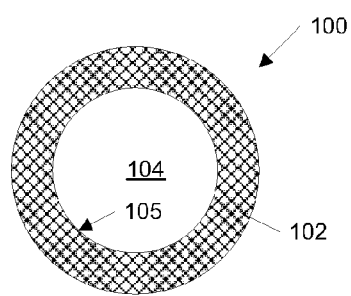
FIGS. 1A-1D are cross-sectional views of capsules according to embodiments of the present invention.

FIG. 1A is a cross-sectional view of one embodiment of a capsule 100 having a diamond shell 102 that is substantially spherical and of uniform thickness and an interior region 104 defined by an inner wall 105 of shell 102. Like all drawings herein, FIG. 1A is not to scale, and different embodiments may be of different sizes; e.g. the shell may have a diameter (measured at the outer surface of the shell) with a length between about 20 microns and about 1 meter. The thickness of the shell may range from less than 1% to about 99% of the major axis of the shell.

The size of capsule 100 and thickness of the shell are advantageously determined in accordance with the intended use of capsule 100. For example, ball bearings are usually designed to accommodate loads up to some maximum limit. The load requirements along with the compressive and fracture strength of the particular diamond material (or combination of materials) used to form shell 102 can be used to determine a suitable thickness for shell 102 in relation to the diameter of capsule 100. In addition, in some embodiments, an inner form (described below) may be present and may contribute to the structural strength and integrity of the finished bearing. For a common ball bearing with a diameter of about 15 mm, a shell thickness of 340 to 350 μm might be provided; for other applications, different dimensions would be used.

Figure 2A:
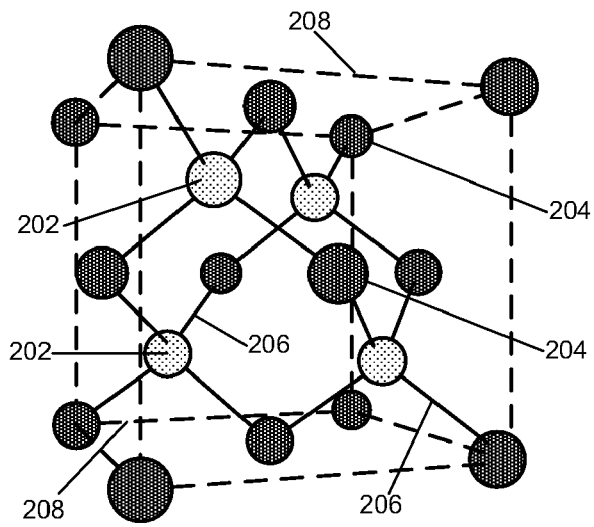
FIGS. 2A and 2B are schematic illustrations of diamond and graphite atomic lattices, respectively.

In some embodiments, diamond shell 102 is made of crystalline diamond. As is well known in the art, a crystal is a solid material consisting of atoms arranged in a lattice, i.e., a repeating three-dimensional pattern. In crystalline diamond, the lattice is a diamond lattice 200 as shown in FIG. 2A. Diamond lattice 200 is made up of atoms 202 connected by $sp^3$ bonds 206 in a tetrahedral configuration. (Lines 208 are visual guides indicating edges of a cube and do not represent atomic bonds.) As used herein, the term "diamond" refers to any material having atoms predominantly arranged in a diamond lattice as shown in FIG. 2A and is not limited to carbon atoms or to any other particular atoms. Thus, a "diamond shell" may include predominantly carbon atoms, silicon atoms, and/or atoms of any other type(s) capable of forming a diamond lattice, and the term "diamond" as used herein is not limited to carbon-based diamond.

In other embodiments, diamond shell 102 is an imperfect crystal. For example, the diamond lattice may include defects, such as extra atoms, missing atoms, or dopant or impurity atoms of a non-majority type at lattice sites; these dopant or impurity atoms may introduce non-$sp^3$ bond sites in the lattice, as is known in the art. Dopants, impurities, or other defects may be naturally occurring or deliberately introduced during fabrication of shell 102.

In still other embodiments, diamond shell 102 is made of polycrystalline diamond. As is known in the art, polycrystalline diamond includes multiple crystal grains, where each grain has a relatively uniform diamond lattice, but the grains do not align with each other such that a continuous lattice is preserved across the boundary. The grains of a polycrystalline diamond shell 102 might or might not have a generally preferred orientation relative to each other, depending on the conditions under which shell 102 is fabricated. In some embodiments, the size of the crystal grains can be controlled so as to form nanoscale crystal grains; this form of diamond is referred to as "nanocrystalline diamond." For example, the average value of a major axis of the crystal grains in nanocrystalline diamond can be made to be about 100 nm or less.

Figure 2B:
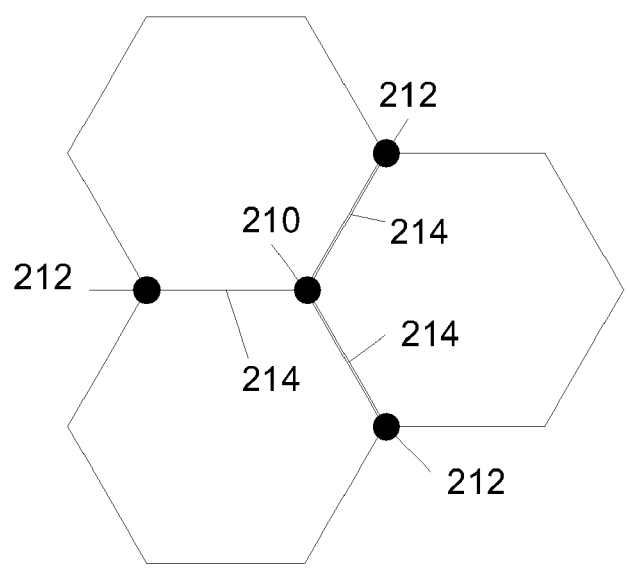

In still other embodiments, diamond shell 102 is made of amorphous diamond. Amorphous diamond, as described in above-referenced document [SULL], does not have a large-scale diamond lattice structure but does have local (e.g., on the order of 10 nm or less) diamond structure around individual atoms. In amorphous diamond, a majority of the atoms have $sp^3$-like bonds to four neighboring atoms, and minority of the atoms are bonded to three other atoms in a $sp^2$-like bonding geometry, similar to that of graphite; FIG. 2B depicts graphite-like $sp^2$ bonds 214 between an atom 210 and three other atoms 212. The percentage of minority ($sp^2$-bonded) atoms may vary; as that percentage approaches zero over some area, a crystal grain becomes identifiable.

Thus, it is to be understood that the term "diamond material" as used herein includes single-crystal diamond, polycrystalline diamond (with ordered or disordered grains), nanocrystalline diamond, and amorphous diamond, and that any of these materials may include defects and/or dopants and/or impurities. Further, the distinctions between different forms of diamond material are somewhat arbitrary not always sharp; for example, polycrystalline diamond with average grain size below about 100 nm can be labeled nanocrystalline, and nanocrystalline diamond with grain size below about 10 nm can be labeled amorphous.

Shell 102 may include multiple layers of diamond material, and different layers may have different composition. For example, some but not all layers might include a dopant; different polycrystalline oriented layers might have a different preferred orientation for their crystal grains or a different average grain size; some layers might be polycrystalline oriented diamond while others are polycrystalline disoriented, and so on. In addition, coatings or implantations of atoms that do not form diamond lattices may be included in shell 102.

Shell 102 may be fabricated as a unitary diamond structure, which may include crystalline, polycrystalline or amorphous diamond. Alternatively, shell 102 may be fabricated in sections, each of which is a unitary diamond structure, with the sections being joined together after fabrication. Examples of both types of fabrication processes are described below.

Figure 1B:
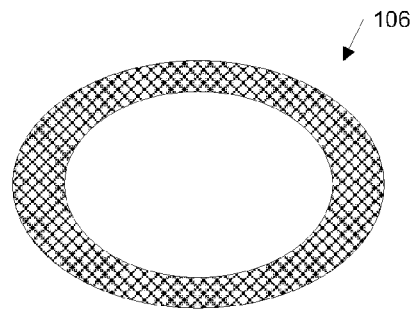
Figure 1C:
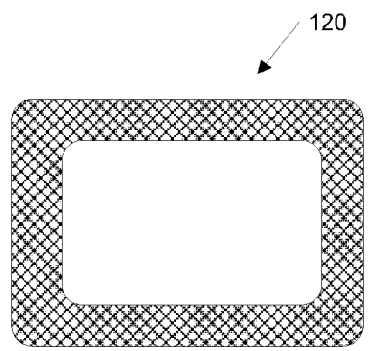
Figure 1D:
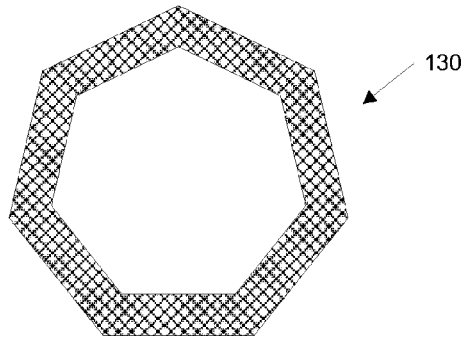

The overall shape of the capsule may be spherical as shown in FIG. 1A, ellipsoidal as shown by capsule 106 of FIG. 1B, or similar shapes. In some instances, a generally smooth (e.g., spherical or ellipsoidal shape) may have local deviations. In other embodiments, the capsule may have a polyhedral shape with rounded or sharp corners. For example, FIG. 1C is a cross-sectional view of a generally rectangular capsule 120, and FIG. 1D illustrates a capsule 130 with a heptagonal cross section. Cross-sections of a capsule in different planes may have different shapes. For example, a cylindrical capsule might have a circular cross section (similar to FIG. 1A) in a transverse plane and a rectangular cross section (similar to FIG. 1C) in a longitudinal plane.

B. Capsule Interior

Figure 3A:
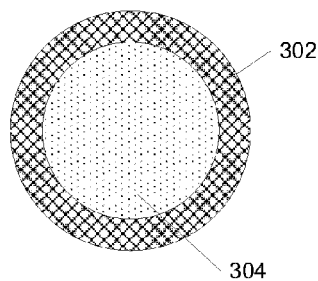
FIGS. 3A-3G are cross-sectional views of capsules according to further embodiments of the present invention.

As shown in FIG. 1A, shell 102 defines an interior region 104. Interior region 104 may be generally empty, as shown in FIG. 1A, or it may be filled with various materials. For example, FIG. 3A is a cross-sectional view of a capsule 302 whose interior 304 contains a fluid substance (indicated by shading). The term "fluid" as used herein refers to any gas or liquid substance, and a fluid in the interior may be at ambient pressure, or at higher or lower than ambient pressures.

Figure 3B:
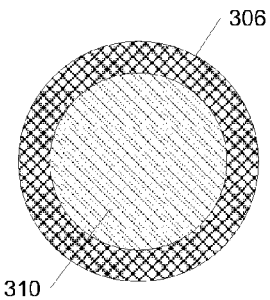
Figure 3C:
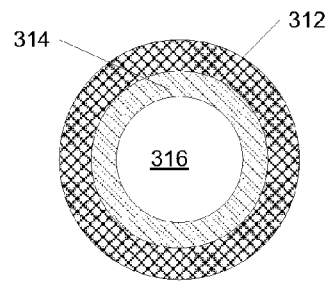
Figure 3D:
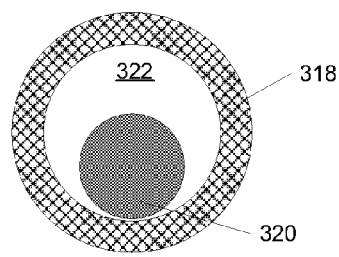
Figure 3E:
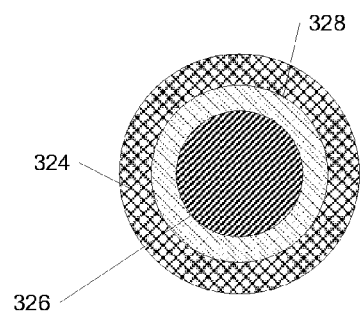

Solid materials may also be present in the interior of a capsule. FIG. 3B is a cross-sectional view of a capsule 306 with a solid material 310 filling the interior. Solid material 310 may partially or completely fill the interior. For instance, FIG. 3C is a cross-sectional view of a capsule 312 in which a solid material 314 with a hollow core 316 occupies the interior. In some embodiments, hollow core 316 might be filled, e.g., with a fluid material. FIG. 3D is a cross-sectional view of another capsule 318 in which a solid material 320 only partially fills the interior 322; the remainder of interior 322 might be filled with a fluid In this instance, solid material 320 might be secured to a point on the inner wall of the capsule shell to impart a desired eccentricity of motion, or it could be detached and free to move around within interior 322 as capsule 318 moves. In some embodiments, the solid material may be multilayered. For instance, FIG. 3E is a cross-sectional view of a capsule 324 whose interior is filled by a core 326 and a coating 328.

In some embodiments, the interior of the capsule may be a ball-shaped form over which the diamond shell is grown as described below, e.g., in Section II.B. The form, or at least its outer surface, may be made of any material on which diamond can be grown. Examples of suitable materials for the outer surface (or the entirety) of a ball-shaped form include silicon, silicon carbide, silicon nitride, silicon dioxide (including quartz), titanium, titanium carbide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, any suitable glass, or aluminum oxide (including alumina).

C. Access Port

Figure 3F:
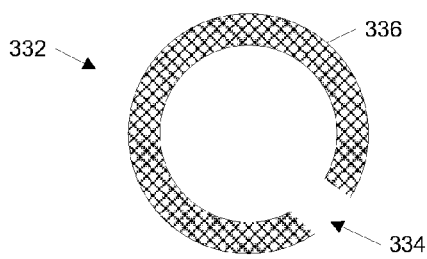

In some embodiments, the capsule shell may form a complete barrier preventing access to the interior. In other embodiments, the shell includes one or more openings (referred to herein as "access ports") that permit access to the interior. FIG. 3F, for example, is a cross-sectional view of a capsule 332 with an access port 334 in the shell 336. The access port may be a simply be a hole whose size is measured as a percentage of missing surface area. Access ports can range in size from nearly 0% to about 50% of the surface area. The port can be normal to the surface or at an oblique angle, and may provide a straight path, bent path, or curved path connecting the exterior and interior of the shell.

Figure 3G:
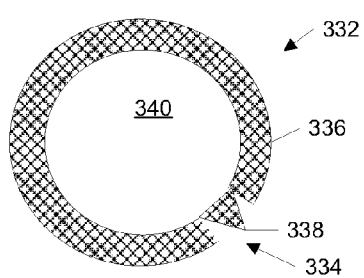

In some embodiments, a sealable member (e.g., a valve, plug or other structure) may be provided, allowing the port to be opened or closed. FIG. 3G schematically illustrates a plug or valve 338 that closes port 334 of capsule 332. Plug or valve 338 can be opened to allow material to be inserted into or removed from the interior, or it can be closed to keep material in or out of the interior. Plug or valve 338 can be formed as an integral part of the shell, e.g., as a deformable flap 306 of diamond material, or as a separate structure. Further examples of access ports and valve or plug structures for closing access ports, as well as techniques for fabricating such features, are described in Section II below.

D. Coating of the Shell

As is known, carbon-based diamond crystals, whether synthetic or naturally occurring, can be damaged by exposure to high temperatures in an oxidizing environment. To protect a carbon-based diamond capsule 100 (FIG. 1A), a stabilizing coating, such as a silicon carbide film, may be applied to the outer surface of shell 102. The stabilizing material may be applied as a coating over the diamond shell or implanted between the crystal grains.

In some embodiments, a unique pattern can be made by small variations in the thickness of the stabilizing coating. These variations, which are detectable under ultraviolet (UV) and/or x-ray examination of the shell, can be used to provide a unique signature to each capsule. In addition, silicon carbide layers may be incorporated into shell 102 to facilitate and control fabrication of a relatively thick shell 102. A further discussion of silicon carbide coatings for stabilization and identification can be found in above-referenced U.S. Provisional Application No. 60/554,194.

A variety of materials may be used to coat and stabilize diamond shells. Examples include silicon, germanium, silicon carbide, silicon dioxide (including quartz), silicon fluoride, magnesium fluoride, silicon nitride, titanium, titanium dioxide, titanium carbide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, chromium oxide, or aluminum oxide (including alumina). Suitable materials also include various other oxides, carbides, nitrides, fluorides or the like.

E. Applications of Capsule Structures

Capsules of the type described above are usable in a variety of applications. For example, hollow or filled spherical diamond capsules can be shaped to very high surface smoothness and uniformity, such that they can be used as high-precision ball bearings. In other embodiments, a cylindrical diamond capsule may be formed with surface features such that it can be used as a geared bearing.

Various properties of diamond capsules such as those shown in FIGS. 1 and 3 make them suitable for these and other applications. For example, diamond capsules can be made with high strength (measured, e.g., by resistance to deformation or fracture), depending on the thickness of the shell and the orientation and size of the crystal grains. For example, polycrystalline, nanocrystalline, or amorphous diamond can provide an isotropically strong shell, while the strength of a single-crystal diamond shell varies depending on the direction in which a stress is applied. In some embodiments, the shell is designed to bear all mechanical, thermal, optical or electrical stresses on the part, without regard to the strength or capacity of any material that may be present inside the shell. In other embodiments, the diamond shell can be designed to interact with a core material (e.g., a solid filling material as shown in FIG. 3B) at some critical load level to prevent permanent distortion of the diamond shell.

Diamond capsules can also be made with very smooth interior and/or exterior surfaces. For example, surface smoothness may be defined based on the maximum or root-mean-square (RMS) deviation from a given locus defining a "perfect" surface shape or from a measured locus defining an average surface shape. Smoothness may be measured by sampling the entire surface or just within a certain region on the surface. In one embodiment, the maximum deviation is controlled to within about 4 nm.

Diamond shells for capsules can also be made with very uniform thickness. Using techniques described below, the shell thickness may be controlled such that a maximum or RMS deviation of the distance between the inner and outer surfaces does not exceed a specific value; for example, the maximum deviation may be less than about 200 nm. Where the shell is spherical, uniform thickness implies concentricity of the internal and external shells; as a result, the spherical capsule will exhibit a uniform weight distribution, which is often desirable for ball bearings and other applications.

In other embodiments, the shapes of the inner and outer surfaces of a spherical diamond shell are controlled to provide a non-zero concentricity offset. Concentricity can be measured by sampling points on each of the inner and outer surfaces and using those points to determine an "inner center" and an "outer center"; to the extent that these two centers are different, the spheres are not concentric. Concentricity can be controlled by controlling the thickness of the shell during fabrication thereof; specific techniques are described in section II below and in above-referenced application Ser. No. 11/067,609. In some embodiments, shells may be made with a precisely controlled concentricity offset, which may be near zero or non-zero as desired.

Methods of measuring smoothness and concentricity are described in above-referenced application Ser. No. 11/067, 609. Suitable techniques described therein include scanning probe microscopy (SPM), atomic force microscopy (AFM), interferometric microscopy (IM) using electromagnetic or acoustic waves, and the like.

For other applications, a diamond capsule can be shaped as a geared bearing that provides high precision, strength, and durability. Geared bearings are sometimes used to provide precise control over the movement of parts, and the coupling of the gears can help to prevent slippage of the bearings, especially during high speed movement where rolling friction between a moving part and the bearing is less than the inertial resistance of the moving part.

Figure 4B:
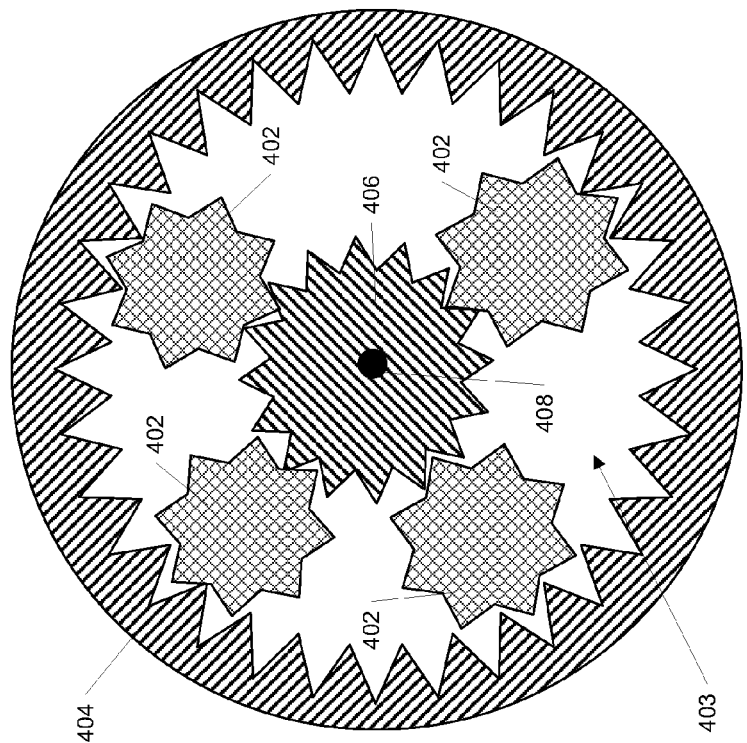
FIGS. 4A-4B are views of a precision cylindrical bearing with gear-like teeth according to an embodiment of the present invention.
Figure 4A:
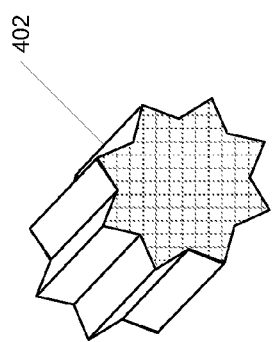

FIGS. 4A-4B illustrate an embodiment of the present invention that provides geared bearings. FIG. 4A is a perspective view of a cylindrical geared bearing 402. Bearing 402 is a diamond capsule as described above with a shell having a gear-toothed shape as shown. Such a capsule can be formed by growing diamond in a suitably shaped mold, as described below. The interior may be hollow or may be filled with diamond or other material as desired.

As shown in FIG. 4B, bearing 402 is so sized and shaped as to fit in a path 403 between an outside race 404 and an inside race 406. Races 404 and 406 can rotate relative to each other about a common center point 408 on an axis normal to the page; in some embodiments, one of races 404 and 406 is fixed to a machine structure while the other rotates about center point 408. Multiple bearings 402 may be placed in path 403. Races 404 and 406 are advantageously made of materials that provide high strength and very low rolling friction, such as silicon carbide and/or diamond. Fabrication processes similar to those described herein or other processes may be used to form races 404 and 406.

Since the rolling motion of different bearings 402 can be mechanically coupled by their gear-like shape as shown in FIG. 4B, they can be used in low friction bearing races rotating at speeds at which smooth bearings, which depend on a frictional coupling with the race, would slip. It should also be noted that no cage is required to separate and evenly distribute multiple bearings 402; instead, once loaded in a respective position between races 404 and 406, each bearing 402 is locked into a position relative to other bearings 402.

II. Methods of Manufacturing Diamond-Lattice Capsules

As noted above, the shell of a capsule can be made in sections and then assembled, or the shell can be grown substantially complete as a single section. Examples of both types of processes will now be discussed.

A. Forming and Attaching Sections of a Shell

Figure 5:
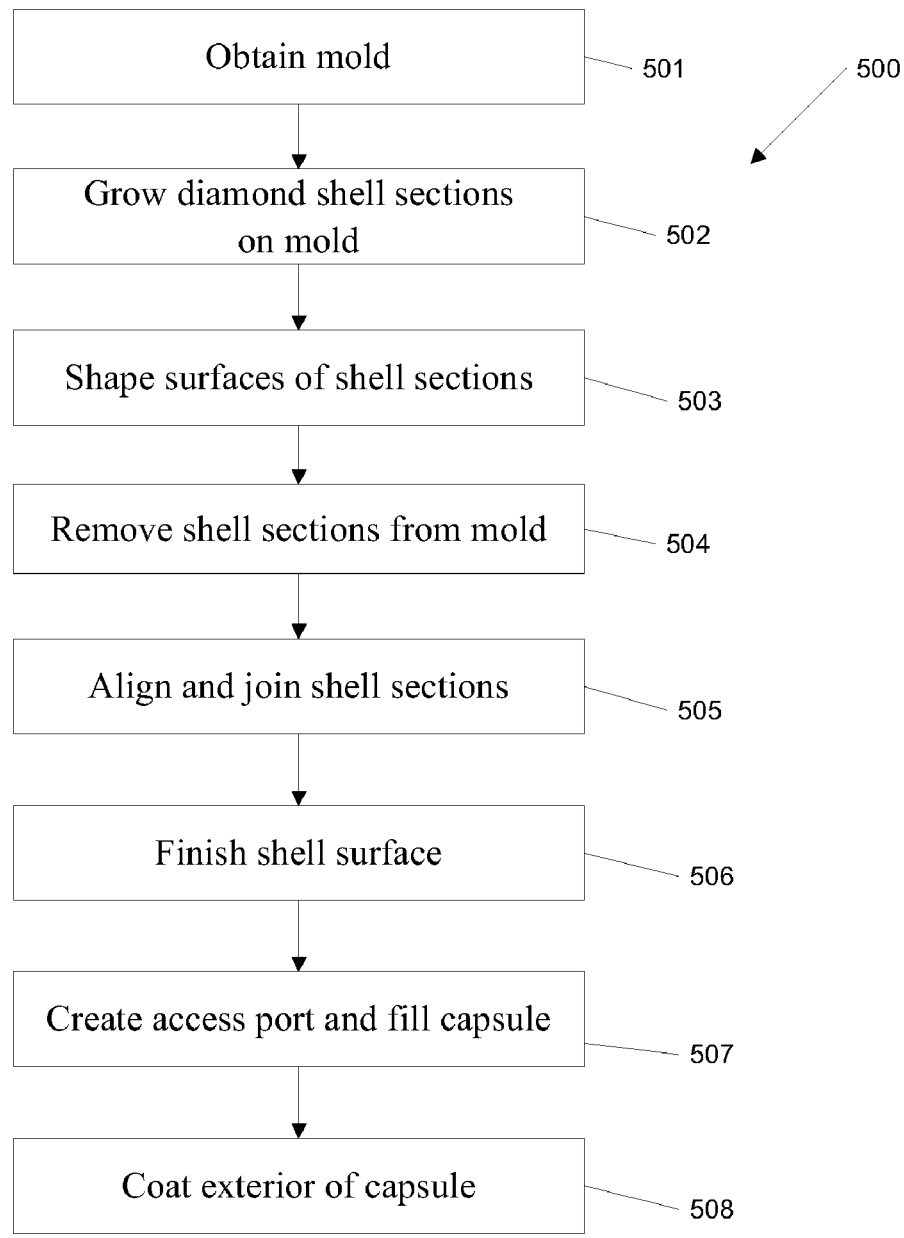
FIG. 5 is a flow diagram of a process for making a capsule from shell sections according to an embodiment of the present invention.

FIG. 5 is a flow diagram of a process 500 for forming a diamond capsule according to an embodiment of the present invention, and FIGS. 6A-6K are illustrations of the capsule at various stages of process 500. In process 500, sections of a shell for a capsule are grown on suitably shaped substrates or molds, then attached or bonded together.

At step 501, a suitably shaped substrate (also referred to herein as a "form substrate" or "mold") is obtained. The mold has a surface shaped to the desired inner or outer surface configuration of a portion of the capsule such that diamond material grown on the mold takes the desired shape.

For instance, FIG. 6A is a cross-sectional view of a form substrate (mold) 600 that may be obtained at step 501. Mold 600 includes a 1-0-0 silicon wafer 602 having a top surface 603 on which hemispherical surface structures 604 are provided for forming substantially spherical capsules. Structures 604 may be formed integrally to wafer 602, e.g., using conventional silicon growth or etching processes. Alternatively, structures 604 may be formed separately from wafer 602, then bonded thereto. Structures 604 are advantageously shaped and finished to the desired shape and surface quality of the inner surface of the capsule shell. The shape and finish of structures 604 may take into account differences in thermal expansion characteristics and other properties between the substrate material and the diamond material to be grown thereon.

It is to be understood that while hemispherical structures are shown in FIG. 6A, structures with other shapes may be substituted to produce capsule sections in shapes other than hemispheres. In some embodiments, the surface structures of a mold may include recessed (concave) structures instead of or in addition to the convex structures depicted in FIG. 6A.

Where silicon molds are used, conventional techniques for preparing the substrates; shaping, smoothing, polishing or otherwise working the diamond material grown thereon; and removing the substrate material from the diamond material may be used. However, the present invention is not limited to silicon molds; any material on which diamond can be grown may be substituted. Examples of suitable materials include silicon, silicon carbide, silicon nitride, silicon dioxide (including quartz), titanium, titanium carbide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, any suitable glass, or aluminum oxide (including alumina). In addition, the bulk of a mold structure such as structure 604 may be made of a first material that is easily shaped to high precision but not necessarily suited to growing diamond and coated with a layer of a different material more suited to growing diamond.

Referring again to FIG. 5, at step 502, one or more layers of crystalline, polycrystalline, or amorphous diamond material (i.e., any material having a diamond lattice) is grown on at least a portion of the mold surface to form a shell section. The surface of the layer(s) generally follows the shape of the substrate surface. For example, FIG. 6B shows hemispherical diamond shell sections 606 formed on hemispherical structures 604 of mold 600.

Conventional techniques for growing a diamond layer on a flat surface may be employed in combination with the non-flat surface of mold 600 to grow a diamond layer on the mold surface. If appropriate, the surface of structures 604 may be seeded to facilitate growth of the diamond material thereon. Various growth processes may be used. For example, crystalline or polycrystalline diamond can be grown using chemical vapor deposition (CVD), plasma enhanced chemical vapor deposition (PECVD), hot wire diamond growth, or the like. Amorphous diamond can be grown using pulsed laser deposition (PLD) or other processes known in the art. Suitable process parameters for each of these techniques are known in the art and may be employed to form shell sections 606.

Where polycrystalline or nanocrystalline diamond is grown, the growth process may foster the formation of crystal grains with either a preferred or random orientation relative to a surface of the layer. Techniques known in the art for growing ordered or disordered polycrystalline or nanocrystalline diamond may be employed.

In some embodiments, multiple diamond layers are grown successively during step 502 (FIG. 5), and different layers may have different grain sizes (e.g., some layers might be polycrystalline while others are nanocrystalline or amorphous). The grains in different layers may have the same preferred crystal orientation, different preferred orientations, or random orientations as desired. In some embodiments, the surface structures of the mold define fittings at or near peripheral edges of some or all of the shell sections, and the fittings are grown as part of the shell sections. For instance, recesses may be formed on one section that match protrusions on another section; such fittings can be used in capsule assembly, as described below.

In some embodiments, dopants or other materials are introduced during the growth process to provide desired electrical, thermal or mechanical properties in the completed shell. The term "dopant" as used herein refers to atoms of a type other than the type of which the diamond lattice is predominantly composed that occupy lattice sites. Dopant atoms may provide more, fewer, or the same number of bonding sites as the majority atoms and may be introduced for a variety of purposes. For example, dopants may be added to make certain layers, certain regions, or all of the shell conductive. Dopants or other materials may also be used to control the thermal expansion coefficient of the shell or to stabilize the shell from oxidation at high temperatures. Some dopants may also change the absorption cross section for various forms of radiation that may be incident on the shell. A variety of dopants may be used, including boron, nitrogen, astatine, polonium, americium, antimony, bismuth, arsenic, germanium, iodine, tellurium, selenium, silicon, and bromine.

Other materials can also be introduced, e.g., as discrete layers between two layers of diamond material or covering the outermost layer of diamond material. Examples include stabilizing materials, such as silicon, germanium, silicon carbide, silicon dioxide (including quartz), silicon fluoride, magnesium fluoride, silicon nitride, titanium, titanium dioxide, titanium carbide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, chromium oxide, or aluminum oxide (including alumina). Suitable materials also include various other oxides, carbides, nitrides, fluorides or the like. Still other suitable materials provide adhesive properties; examples include the above materials as well as gold, silver, copper, nickel, platinum, indium, palladium, lead and uranium.

Dopants or other materials can be introduced during growth of a diamond or other material layer, or during separate ion implantation, diffusion, or coating steps that may be performed at various stages during growth of the shell sections. Processes known in the art may be used to introduce dopants during diamond growth or to grow or deposit layers of other material between stages in diamond growth. Where a multilayered shell section is grown, dopants or other materials may be included in some, all or none of the layers.

In some embodiments, dopants or other materials help to facilitate and control growth of the shell. For example, where relatively thick shells are being formed, introduction of dopants or other materials at various stages during diamond growth can help reduce strain on the diamond lattice, e.g., by creating layers with varying interatomic distances resulting from the dopant atoms or material layers. Introduction of such layers can help to maintain the proper atomic spacing (thus reducing strain) within the different layers of polycrystalline or nanocrystalline diamond material as the diameter of the shell increases. Layers of amorphous diamond can also be introduced to relieve strain.

In one such embodiment, for a spherical shell with an inner diameter of 1.95 mm, and an outer diameter of 2 mm (or more), diamond might be grown to a thickness of at least 50 micrometers (about 5% of the radius of the sphere). Thereafter, a silicon coating can be deposited over the diamond layer, followed by implantation of germanium into the silicon and further diamond growth. The surface of the shell may be reseeded prior to further diamond growth. It is to be understood that other dopants or combinations of dopants may also be used and that such dopants may be added continuously throughout the diamond growth process or only during selected stages of diamond growth as desired.

Referring again to FIG. 5, at step 503, following growth of the shell material, the shell surfaces may be further shaped to impart desired properties (e.g., smoothness or desired surface features) thereto. Prior to such shaping, the substrate may be cut apart (e.g., by dicing the wafer) and some or all of the excess material stripped away, allowing each section to be processed separately; FIG. 6C illustrates a shell section on a wafer portion 602' that may result from dicing wafer 602 of FIG. 6B. Alternatively, a group of shell sections may be processed together while still attached to a common substrate, and dicing is not required. In some embodiments, the shell sections 606 may be removed from the molds 600 prior to post-growth shaping, allowing both inner and outer surfaces of the shell sections to be shaped.

A variety of shaping operations may be performed. In some embodiments, the inner and/or outer surfaces may be chemically modified, polished, lapped, or ground to a desired smoothness, e.g., such that a maximum local deviation from smoothness on the surface is less than about 4 nm. Conventional micromachining or nanomachining processes may be used. Additional tools and processes for shaping diamond surfaces at nanoscale precision are described in above-referenced application Ser. No. 11/067,609.

In other embodiments, portions of the surface of a shell section 606 may be machined or chemically modified to provide fittings for a mechanical connection between sections. For example, FIG. 6D shows a hemispherical shell section 608 with complementary fittings 610, 612, which may be grown during step 502 using suitably shaped molds, then machined during step 503 to precise tolerances. Two shell sections 608 can be interlocked using fittings 610, 612 as described below.

In still other embodiments, some or all of the diamond shell sections may be differentially heated to provide or enhance a desired chemical, structural, mechanical, acoustic, optical, electrical or magnetic property that depends on absolute temperature of the object and/or on a temperature differential between different portions of the object. In some embodiments, the difference in properties between shell sections may persist after the completed shell reaches thermal equilibrium; in other instances, a transient difference in properties (e.g., a size difference between shell sections due to thermal expansion of one of the sections) is induced and exploited to assemble shell sections as described below.

Figure 6E:
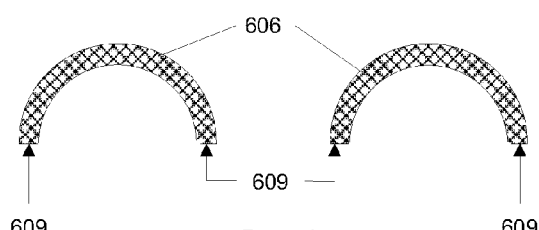

Referring again to FIG. 5, at step 504, the shell sections are removed from the mold. FIG. 6E is a cross sectional view of hemispherical diamond shell sections 606 of FIG. 6B after removing mold 600, including hemispherical sections 604.

In some embodiments, removal of the mold involves destruction of at least part of the mold material. For instance, all or part of the mold material may be removed using conventional wet or dry etching processes that chemically dissolve the mold material but not the shell material. Where the substrate is made of silicon, a well-known dry etchant such as $CF_6$ might be used. Examples of wet etchants include liquid sodium hydroxide, which can be used at 300° C. in the Bayer process to dissolve alumina; lye; aqua regia; hydrofluoric acid; and the like.

In other embodiments, the removal process does not destroy the integrity of the mold, allowing the mold to be reused. For example, in FIG. 6C, if shell section 606 covers about 50% (or less) of a spherical surface, then the mold 602 can be popped out by slightly flexing shell section 606 and/or mold 602.

Figure 6F:
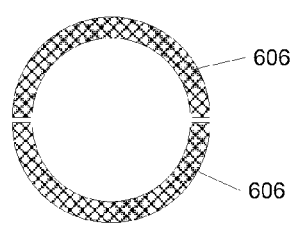

Referring again to FIG. 5, at step 505, the shell sections 606 (FIG. 6E) are aligned and joined at their peripheral edges 609 to form a capsule, as shown in FIG. 6F. Joining step 505 may be accomplished using various mechanical or chemical bonding techniques. In some embodiments, joining step 505 is performed in a fluid environment, and the resulting capsule is thereby filled with fluid. Examples of joining techniques will now be described; it is to be understood that other techniques could be substituted.

Figure 6G:
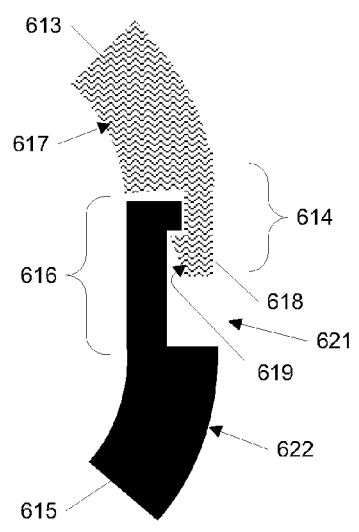

In some embodiments, the peripheral edges 609 of shell sections 606 are shaped such that they interlock when pushed together. For example, FIG. 6G shows a magnified view of a complementary latch 614 and socket 616 at the junction of two shell sections 613, 615. Latch 614 on a peripheral portion of the inner surface 617 of shell section 613 has a protrusion 618 with a sloping interior surface 619 followed by a recess 620 in the opposite direction from the slope. Socket 616 of shell section 615 has a recess 621 on the outer surface 622. The two sections 613, 615 interlock when pushed together in relative alignment, as shown in FIG. 6G.

Figure 6H:
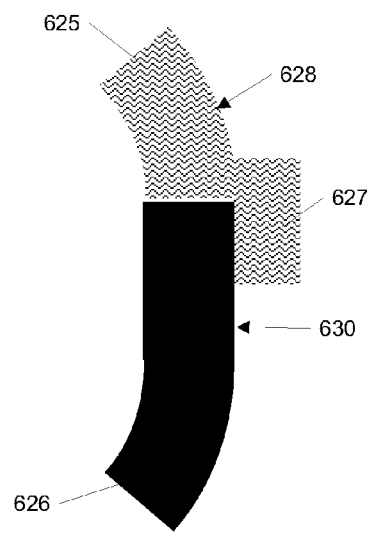

In other embodiments, the two shell sections are joined using a form fit or interference member that extends in a band around the widest point of the capsule to hold the sections together under pressure. For example, FIG. 6H shows a magnified view of shell sections 625, 626 that are held together by an interference ring 627. The interference ring 627 is made as a protrusion approximately parallel to the surface 628 of shell section 625 and may be an integral part of shell section 625. Interference ring 627 is shaped such that its inner surface aligns with the outer surface 630 of the other shell section 626. In some embodiments, in order to join the sections, a temperature differential is created such that section 626 is at a lower temperature than the section 625 while sections 625 and 626 are pushed together as shown. The resulting shell is then allowed to come to thermal equilibrium while sections 625 and 626 are held in place. As equilibrium is reached, section 625 contracts and/or section 626 expands so that the outer surface 630 pushes into the inner surface of interference ring 627, thus creating an interference contact.

For instance, shell section 626 may be cooled to 4 K while shell section 625 is kept at a higher temperature (around 20 K) such that the interference ring 627 is a close but sliding fit on the target shell section 626. The two sections 625, 626 are pushed together and allowed to reach equilibrium temperature at 4 K, thereby contracting ring 627 into interference contact with section 626 and completing the assembly. This assembly procedure can be executed in a fluid environment (e.g., a hydrogen atmosphere), and the resulting capsule will contain some amount of the fluid.

Figure 6I:
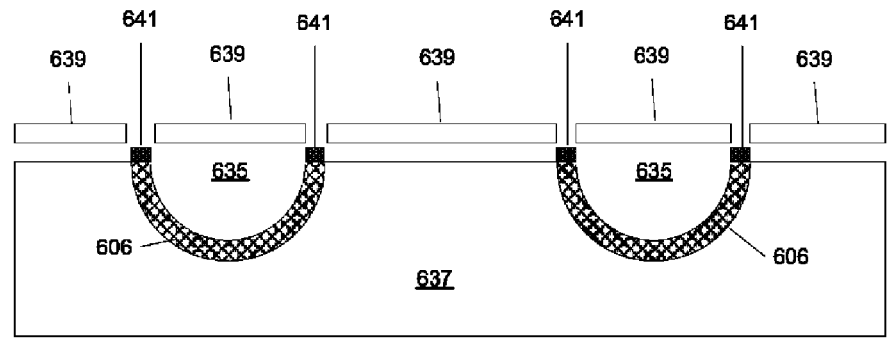

In other embodiments, the shell sections are joined using a bonding agent. For example, as shown in FIG. 6I, shell sections 606 can be placed in recesses 635 of a coating and alignment substrate 637 and aligned under a mask 639 so that edges 609 are exposed. Coatings 641 are then applied to edges 609, e.g., using sputtering or evaporation techniques well known in the art. The coatings 641 are advantageously chosen to have a melting point that is higher than the maximum operating temperature of the finished capsule but lower than the melting point of the diamond shell material.

Figure 6J:
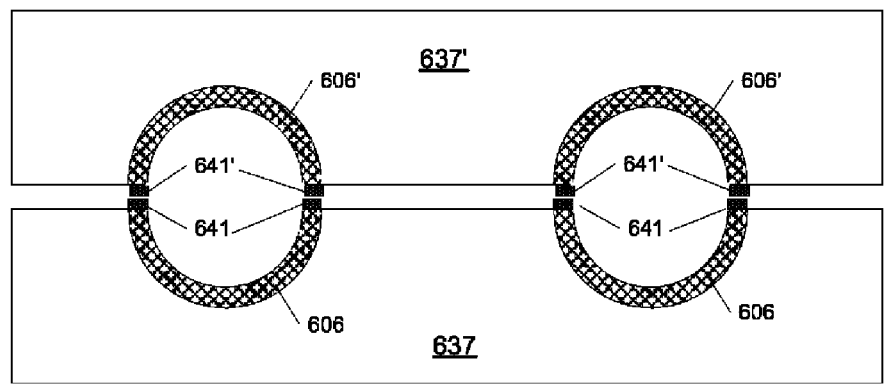

As shown in FIG. 6J, after coatings 641 are applied, edges 609 of section 606 are placed in contact with corresponding edges 609' of a complementary section 606', to which corresponding coatings 641' have been applied. Proper alignment of section 606 with section 605' may be achieved by forming complementary alignment structures in the respective substrates 637, 637', as is known in the art. The entire structure is baked (e.g., in a vacuum or inert gas oven) at a temperature and pressure sufficient to soften or reflow the coatings 641, 641', resulting in a bond between sections 609, 609'.

Coatings 641 may be applied to the entire surface of edges 609 or to selected contact regions on edges 609 as long as each contact region is sufficiently large (e.g., at least about 4 $\mu m^2$) to create a bond. These contact regions may have different orientations with respect to each other so that parts may be joined at complex bond angles; for instance, the edges to be joined can be rotated or tilted at any angle with respect to each other and are not required to be parallel to each other.

Figure 6K:
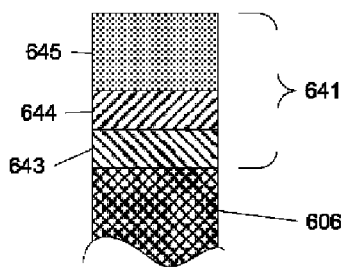

As shown in FIG. 6K, coatings 641 advantageously include multiple materials, such as an "adhesion" material 643 that adheres well to the edge of the diamond shell and a "bond" material 645 that can be softened or reflowed to connect the two sections. In some embodiments, an additional "coupling" material 644 that adheres well to both the adhesion material 643 and the bond material 645 can be deposited between adhesion material 643 and bond material 645; adhesion material 643 and bond material 645 need not adhere particularly well to each other, as long as each adheres well to coupling material 644. In other embodiments, the same material may provide both adhesion and bonding. Suitable materials for coatings 641 for bonding include the above materials, as well as gold, silver, copper, nickel, platinum, indium, palladium, lead and uranium.

Coating 641 are advantageously made of materials that will provide a strong bond at the intended operating temperature of the resulting part. For example, for high-temperature applications (e.g., from about 200° C. up to about 800° C.), metal bonds may be used. In one embodiment, hemispherical shell sections 606 form a spherical capsule with a 2-mm diameter when assembled. A carbide-forming adhesion material 643 (e.g. titanium, silicon, chromium, or iron) is sputtered or evaporated onto edges 609 to a thickness of about 50 to 100 nm. A similar thickness of a coupling material 644 (e.g. nickel) is then applied, followed by a 200 nm to 2 micron thickness of a bond material (e.g. copper). The shell sections 606 are then placed in contact with each other and baked at a sufficient temperature (e.g., 900° C.) and pressure of about 50 g/mm$^2$ to bond the two copper coatings together. Those having ordinary skill in the art will recognize that other coating materials may also be used to provide higher or lower temperature performance.

For lower temperature applications (e.g., below about 200° C.), a similar process may be used, except that an additional material that adheres well to copper and has a lower melting point than copper may be applied after the copper bond material 645. Examples of suitable materials include silver, silver tin, tin, and/or lead, and other solder-like materials. The shell sections can be bonded at a lower temperature, e.g., 250° C.

For even lower temperature applications (e.g., below about 100° C.), edges 609 can be sputtered with silicon, over which a spin-on glass is applied. The shell sections can then be bonded at a temperature of, e.g., 150° C.

In another embodiment, coatings 641 include the adhesion, coupling and bonding materials 643-645 described above, along with a further coating of germanium or any alloy thereof including antimony and tellurium. In other embodiments, coatings 641 may include alloys or layers of astatine, polonium, bismuth, and arsenic. Such coatings provide good low-temperature bonding performance and can also impart desirable electromagnetic absorption characteristics to the finished capsule.

Figure 6L:
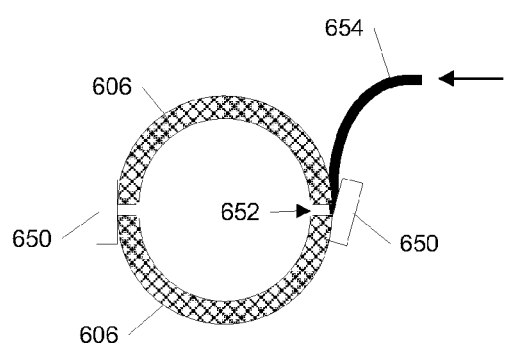

In some embodiments suitable for ultra-low temperature applications (e.g., about 4 K or below), various gases can be used as "cryoglues" to hold the shell sections together. For example, as shown in FIG. 6L, a band 650 is placed around shell sections 606, enclosing the joint line 652. Shell sections 606 are held at an ultra-low temperature (e.g., around 4 K), while a gas is directed inside band 650 using a heated pipe 654. The gas cools and hardens against the diamond joint area 652, providing an adhesive bond.

Gases suitable for use as cryoglues are mechanically inert and provide sufficient strength to hold the sections of the capsule in relative alignment. Examples include noble gases such as neon, argon, krypton, xenon and radon. In particular, neon's extremely low thermal conductivity, nearly five orders of magnitude less then carbon-based diamond, and relatively low melting point (24.48 K) make it a preferred choice as a cryoglue for many applications. It should be noted that cryoglues and cryogluing techniques similar to those described herein can be used to bond parts for ultra-low temperature applications regardless of whether the parts are made of diamond materials or some other material.

It will be appreciated that the bonding agents and techniques described herein are illustrative and that variations and modifications are possible. Any material or combination of materials that provides adequate adhesion between peripheral surfaces of adjacent shell sections at the desired operating temperature may be used.

Referring again to FIG. 5, at step 506, after the shell sections have been joined to form a capsule, an additional layer of diamond may be grown on the outer surface of the capsule. Any of the methods described above may be used, and techniques described below in Section II.B. for uniformly coating a three-dimensional object may also be employed. In some embodiments, the additional growth tends to fill any gaps between the shell sections, providing a smoother surface finish.

In some embodiments, it is desirable to have access to the interior of the assembled capsule, e.g., in order to fill the capsule with some material or in order to modify the interior surface. To allow such access, an access port may be formed through the capsule (step 507). Access ports may be made in various ways. For example, an energetic beam of electrons, ions or photons may be used to remove the diamond material from some portion of the shell, thereby creating an opening to the interior. Femtolasers, which provide very short pulses of energetic photons, can be used to create small, well controlled openings. In other embodiments, nanomachining techniques guided by atomic force microscopy (AFM) or scanning force microscopy (SFM) may be used. Suitable techniques are described in above-referenced application Ser. No. 11/067,609.

Figure 7A:
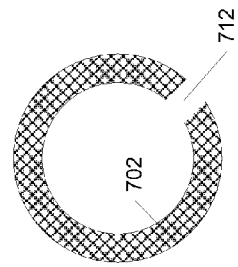
FIGS. 7A-7F are cross-sectional views illustrating a technique for forming a hole in a capsule according to an embodiment of the present invention.
Figure 7B:
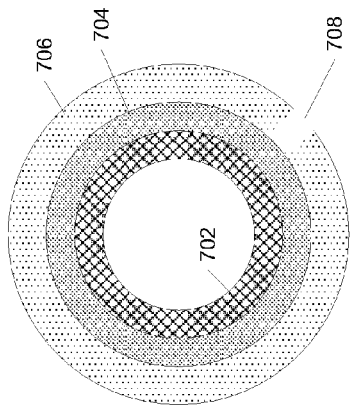
Figure 7C:
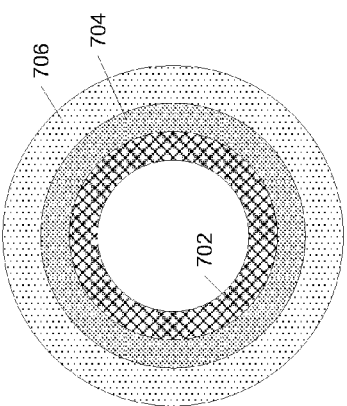
Figure 7D:
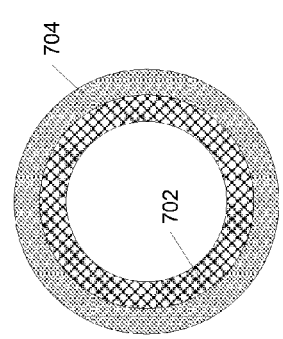
Figure 7E:
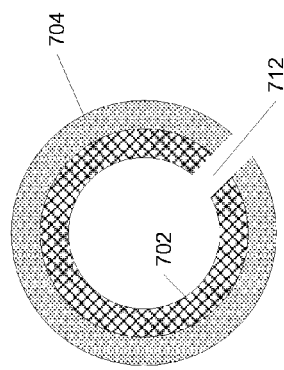
Figure 7F:
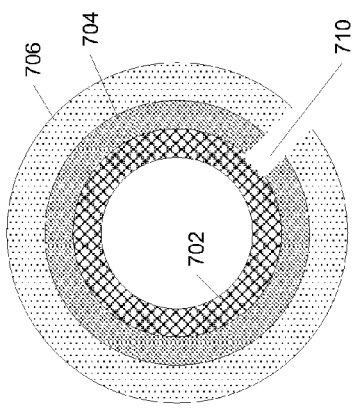

In other embodiments, an access port may be etched through the diamond material. For example, FIGS. 7A-7F are cross-sectional views showing a capsule at various stages of etching a port through the shell. In FIG. 7A, a diamond shell 702 is coated with an etch resist 704 such as aluminum. (It is to be understood that coating thicknesses are not shown to any particular scale in the drawings.) In FIG. 7B, a layer of photoresist 706 covers etch resist 704. In FIG. 7C, photoresist 706 is patterned (e.g., by focused pattern or focused spot, or laser spot or electron beam) so that photoresist 706 covers etch resist 704 except over a region 708 where the access port is to be located. In FIG. 7D, the exposed etch resist 704 has been etched to expose the diamond surface. In FIG. 7E, shell 702 has been etched through opening 710 to create an access port 712. Diamond shell 702 may be etched using, e.g., an oxygen plasma or phosphoric acid. In some embodiments, photoresist 706 is also removed by the etchant used to remove the diamond, leaving exposed etch resist 704, which protects diamond shell 702 everywhere except in region 712. In FIG. 7F, the rest of etch resist 704 has been etched away, producing a diamond shell 702 with an access port 712.

In still other embodiments, an access port can be formed by not enclosing some portion of the joint area where two sections are joined during step 505.

In some embodiments, the access port may be sealed after access to the interior is no longer necessary. For example, where the port is used to fill the capsule with a fluid, additional diamond material can be grown to cover or fill in the port after the capsule has been filled. Masking techniques or other techniques may be used to preferentially grow diamond inside or over the port. In other embodiments, a valve or plug may be provided for sealing the port. Examples of valves and plugs are described below, particularly in Section II.C.

Referring again to FIG. 5, at step 508, the exterior of the capsule is advantageously coated with a protective material, such as silicon carbide. Such a coating may be of the type described in Section I.D above and may be applied using techniques described in above-referenced Application No. 60/554,194 or other suitable techniques.

In some embodiments, the coating provides resistance to oxygen penetration along with specific optical and identification functions. By suitably varying the materials and thickness of successive layers, one can construct a coating with specific optical properties, allowing different capsules to be uniquely identified, e.g., by a combination of scattered light and/or by coherent light signatures. In addition, the mass of the capsule can be used for at least partial identification.

In a specific embodiment, the coating material, e.g. silicon carbide may be doped to be conductive or left in its intrinsic form as an insulator. The silicon carbide layer may be directly coated onto the diamond, or in the case of carbon diamond, a layer of silicon may be deposited to act as an adhesion layer between the carbon diamond and the silicon carbide. In another embodiment, a carbon diamond structure may be implanted with a seed layer of silicon, forming silicon carbide sites. A silicon carbide coating can then be applied by CVD growth of the silicon carbide. The technique is well known in the art and is described, e.g., in the above-referenced article [STOL]). Alternatively, a silicon carbide plasma arc can be allowed to condense on the seeded surface. In yet another embodiment, a vacuum arc of a the desired coating material is applied to a diamond surface that has been made conductive by dopants or by exposure to ultraviolet or x-ray radiation; a vacuum arc can be used to coat diamond surfaces at a wide range of temperatures from near 0 K up to about 1000° C.

A variety of materials may be used to coat and stabilize diamond shells. Examples include silicon, germanium, silicon carbide, silicon dioxide, silicon fluoride, magnesium fluoride, silicon nitride, titanium, titanium dioxide, titanium carbide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, chromium oxide, or aluminum oxide. Suitable materials also include various other oxides, carbides, nitrides, fluorides or the like.

It will be appreciated that process 500 is illustrative and that variations and modifications are possible. Steps described as sequential may be executed in parallel, order of steps may be varied, steps may be modified or combined, or some steps may be omitted. For example, in some embodiments, the shell sections may be removed from the form substrate before any post-growth processing or between post-growth processing steps. An access port might or might not be made, depending on whether access to the interior is desired in a particular embodiment.

Surface modifications may be applied to the shells at various stages in manufacture, e.g., using nanomachining as described in above-referenced application Ser. No. 11/067, 609. For example, the outer or inner surface of shell sections 606 can be machined while sections 606 are still attached to mold 600 or after removal therefrom. In other embodiments, the outer surface of a finished capsule may be modified. In still other embodiments the inner surface of a finished capsule may be modified via a set of suitably positioned access ports.

Figure 6M:
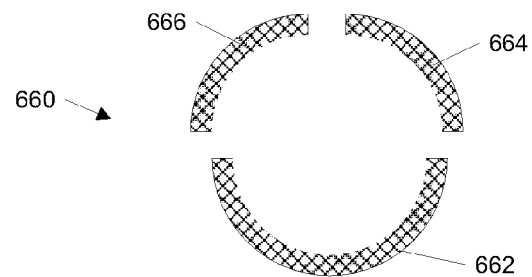

In addition, while hemispherical sections are described herein, it is to be understood that any number of substrate sections may be used. For instance, FIG. 6M is a cross-sectional exploded view of a capsule 660 formed from three sections 662, 664, 666. Further, the process is not limited to spherical capsules; capsules of any shape may be created by using suitably shaped form substrates or molds.

Process 500 can also be used to make capsules whose surfaces have features such as bumps, ridges, gear-like teeth, or the like. For instance, the cylindrical gear-toothed bearings and/or races of FIGS. 4A-4B can be made by growing diamond in suitably shaped concave substrates or by growing diamond in a cylindrical substrate, then machining the surface to create the desired surface features.

In another embodiment, the shell sections may be substantially or completely planar and may be shaped as squares, rectangles, triangles, parallelograms, and/or other generally polygonal shapes. A potentially large number (e.g., 20, 30, or more) of such sections may be connected together at their edges using processes similar to those described above to form a polyhedral shell. In some embodiments, edges of the shell sections may be beveled to provide a larger connection surface. After assembly, the inner and/or outer surfaces may be further shaped, e.g., using nanomachining techniques, to improve the overall smoothness. For example, the edges or corners where planar sections meet may be rounded to some degree Planar shell sections may advantageously be grown with crystal grains having a preferred orientation with respect to the plane. Techniques for inducing diamond growth with a preferred crystal orientation are known in the art and may be used. In one embodiment, the outer surface of each section corresponds to the (100) plane of a diamond lattice, and the resulting capsule surface is generally hard and strong in all directions.

B. Growing a Unitary Shell

Figure 8:
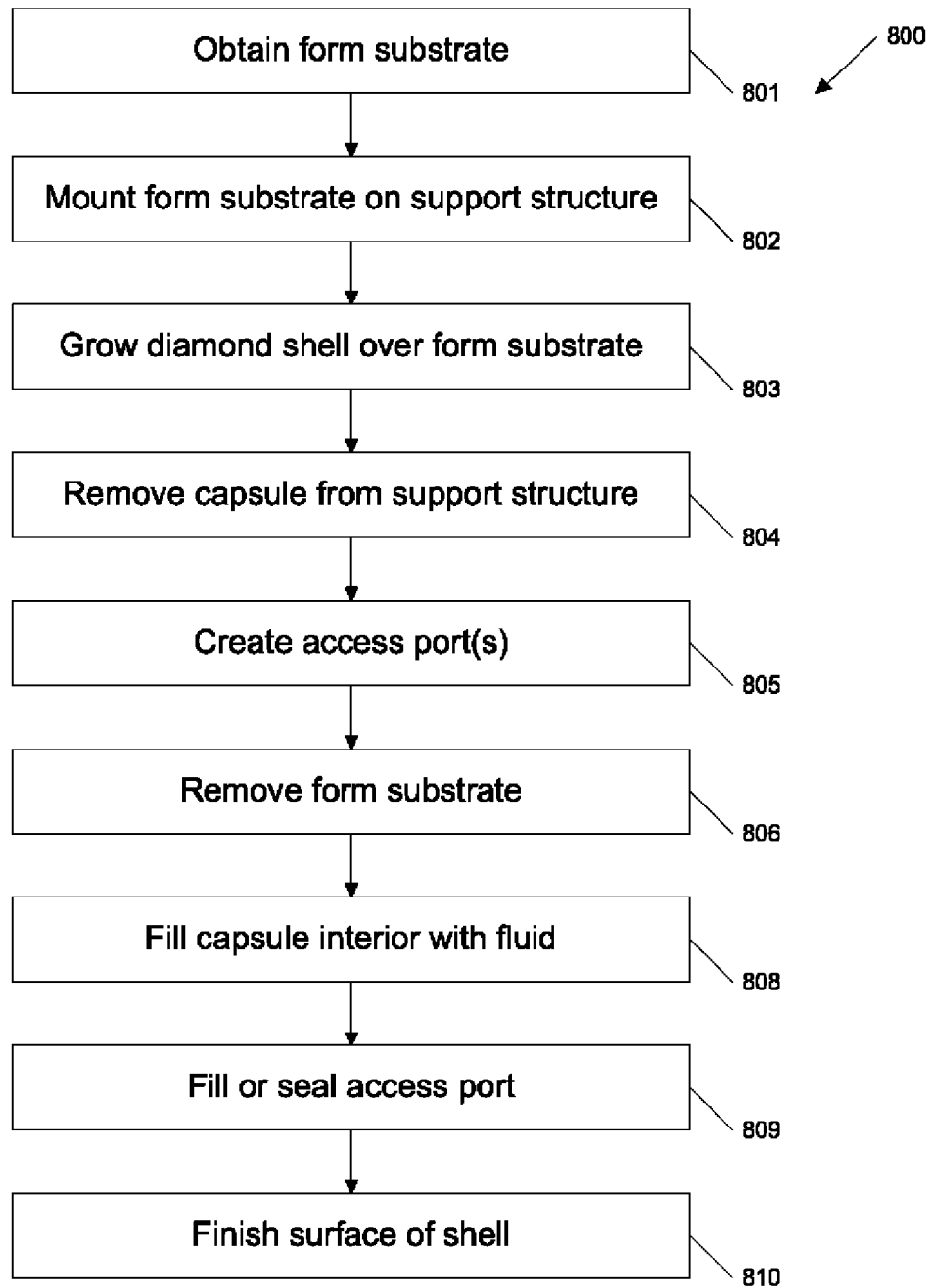
FIG. 8 is a flow diagram of a process for making a capsule according to another embodiment of the present invention.

FIG. 8 is a flow diagram of a process 800 for forming a diamond capsule according to an alternative embodiment of the present invention, and FIGS. 9A-9H are illustrations of the capsule at various stages of process 800. In process 800, a capsule shell is grown around a form substrate such that the shell covers more than half of the surface area of the form substrate.

At step 801, a suitably shaped form substrate is obtained. The form substrate advantageously has the intended shape of the inner surface of the shell, e.g., spherical, elliptical, cylindrical, or polyhedral. The form substrate may be made of any material on which diamond can be grown, and the substrate may have a smooth or featured surface as desired. Any of the materials described in Section II.A above as being suitable for molds may be used to make a form substrate, and a form substrate made of one material may be coated with a different material.

In one embodiment, a spherical form substrate 900 as shown in FIG. 9A is made from an alumina or silicon dioxide (quartz) or glass core 902 that is finished to some degree of smoothness, and a coating 904 applied to the outer surface to provide enhanced smoothness. Coating 904, which may be at least twice as thick as the maximum surface variation of the core 902, is advantageously made of a very hard material (such as SiC or $Si_3N_4$) that can be finished to a finer, smoother surface, sphericity, shape conformity, or shape variability than alumina or silicon dioxide. For example, in one embodiment, the RMS or maximum local deviation from smoothness on an outer surface of form substrate 900 is less than about 4 nm. If the form substrate core 902 is made from a material which can provide the desired degree of smoothness, then an additional coating 904 is not required.

Referring again to FIG. 8, at step 802, the form substrate 900 is suspended by or positioned on a support structure in preparation for diamond growth. For example, FIG. 9B illustrates a support pin 905 holding form substrate 900. It is to be understood that multiple support pins 905 may be provided. Support pin 905 is advantageously made of a material with poor adhesion to diamond or a material that can be etched away after diamond has been grown on form substrate 900.

Other support structures may also be used, including structures with multiple contact points. The support structures may include relatively narrow pins (or rods) that provide a small contact area with form substrate 900, pedestal structures that provide a larger contact area, or the like. In some embodiments, the support structure may include a suspension structure that contacts form substrate 900 from above. Further examples of support structures are described in Section II. C below.

At step 803, a diamond shell is grown over the form substrate; FIG. 9C shows a diamond shell 906 grown over coating 904 of form substrate 900. Selected areas on the surface of form substrate 900 may be patterned and seeded prior to diamond growth, and any of the techniques described in Section II.A above for growing diamond on a shaped substrate may be used for growing the diamond shell at step 803. In some embodiments, step 803 may include growing multiple layers, introducing dopant atoms or other materials, and/or forming coating layers, as described above. Depending on the composition of support structure 905, diamond might or might not coat the surface of structure 905 where it extends beyond the outer wall of shell 906.

In preferred embodiments, diamond shell 906 is made to be relatively uniform. For example, seeded form substrate 900 may be placed on a continuously moving element in the diamond growth chamber, such as a spinning disk with a track along which form substrate 900 can roll, so that all portions of the surface of substrate 900 are approximately uniformly exposed to the plasma or vapor. In another embodiment, form substrate 900 may be moved (e.g., rotated) intermittently during diamond growth to allow diamond shell 906 to grow uniformly over the surface of substrate 900. Pin 905 (or other support structures) may remain in contact with the same point on form substrate 900, or it may move to different points as form substrate 900 is rotated. Where a track is used, the track may provide the support structure, and pin 905 or similar structures may be omitted.

At step 804, after diamond shell 906 is formed, the assembly is removed from pin 905 or other support structures for further processing, including removal of form substrate 900. Removal of the diamond shell may result in one or more holes through diamond shell 906 where pin 905 was in contact with the surface of form substrate 900. For example, FIG. 9D illustrates a hole 908 left by pin 905. In some embodiments, hole 908 is usable as an access port. At this stage, any excess diamond material that may have formed around pin 905 may also be removed (e.g., by cutting, grinding, or the like).

At step 805, one or more additional access ports may be created through diamond shell 906, e.g., if pin 905 or another support structure did not create a suitable hole 908, or if more access ports or larger ports are desired. Techniques described above with reference to step 507 of process 500 (FIG. 5) may be used to create these additional access ports or to enlarge hole 908 into a suitable access port.

Referring again to FIG. 8, at step 806, the form substrate material is removed through the access ports. The form substrate may be removed by wet or dry etching using suitable etchants to dissolve the form substrate material, leaving the diamond shell intact. One suitable etching process is illustrated in FIGS. 9E-9G. A first etchant selectively removes coating material 904 until surface 910 of form core 902 is reached, as shown in FIG. 9E. For instance, if coating material 904 is SiC or $Si_3N_4$, $CF_4$ and/or other etchants known in the art may be used.

Thereafter, a second etchant selectively removes core material 902 through opening 912, as shown in FIG. 9F. For example, if core 902 is made of alumina, liquid sodium hydroxide may be used in the well-known Bayer process to selectively remove core 902. If core 902 is made of silicon dioxide, hydrofluoric acid may be used to etch away the material. The remainder of coating 904 may then be removed using the first etchant (or a different etchant), to obtain the hollow shell 906 shown in FIG. 9G.

It is to be understood that the invention is not limited to specific form substrate materials or etchants, and different techniques for removing core material through an access port may be substituted. In general, the speed with which material can be removed depends at least in part on the number, size, and relative placement of the access ports used for removal, with more and/or larger ports generally correlating with faster removal.

Referring again to FIG. 8, after removal of the form substrate material, at step 808 the interior of the capsule can be filled with a fluid via access port 908 of FIG. 9G, and at step 809 access port 908 is filled or sealed. A wide variety of fluids may be inserted at step 808, and specific examples are described below; in other embodiments, the interior of the capsule is left hollow. In some embodiments, access port 908 is sealed through further diamond growth, e.g., through a mask as described above with reference to step 514 of process 500 (FIG. 5). Diamond may be grown so as to cover or fill in port 908. In other embodiments, various plug or valve structures may be provided for closing access port 908. Specific examples of valve or plug structures and techniques for fabricating them are described below.

For example, in one embodiment, shell 906 with access port 908 (shown in FIG. 9G) is placed into a chamber that is filled with the desired fluid at a high pressure (e.g., in excess of 500 atmospheres). The pressure is kept high for a time ($t_e$) long enough to allow the internal and external pressures to reach equilibrium. Thereafter, the pressure in the chamber is rapidly reduced (e.g., to around 1 atmosphere), and further diamond growth over a time ($t_g$) that is much shorter than $t_e$ closes the access port, trapping the high-pressure fluid inside.

Diamond growth at step 809 may be continued until the ports are sized appropriately to the needs of the application. In some instances, the ports may be completely filled or only partially filled.

In some embodiments, electrical charge may be used to promote or deter diamond growth in or near the access port. For example, all or part of the diamond shell can be made conductive by doping with boron, nitrogen or other suitable dopant. During a diamond growth process, the conductive portions of the shell can then be charged so as to repel the plasma; if the area inside or around the access port is not charged (or is not doped), diamond growth will preferentially occur in or around the access port so that the port can be closed or constricted as desired. It should be noted that for other applications, the conductive portions of the shell could also be charged so as to attract the plasma, so that diamond growth would preferentially occur on the conductive portions of the shell.

In other embodiments, all or a portion of the surface 910 that defines access port 908 (see FIG. 9G) is made conductive by doping one or more layers of diamond shell 906, at least around the desired portions of surface 910. The layers may be doped as shell 906 is grown (e.g., while support structure 905 is present). Any conductive portion along the length of surface 910 may be made to encourage or inhibit diamond growth by inducing an appropriate charge to attract or repel the plasma. In yet another embodiment, diamond growth can be promoted in the portion of surface 910 nearest inner wall 912 by lowering the growth temperature and adjusting the platen temperature of the layer, shell, or coating being grown. In this manner, the size of the access port for each layer, coating, or shell may be controlled, and the size of the port may be varied as a function of depth within the shell.

In other embodiments, access port 908 can be narrowed to a specified diameter (e.g., about 5 microns or less) for some distance along surface 910, as shown in FIG. 9H. The port may then be closed using a diamond plug 914. Diamond plug 914 may be as long as or shorter than the full depth of port 908. Plug 914 can be formed by growing diamond in a suitably shaped mold or by machining diamond parts to the desired shape. Port 908 can be prepared to accept plug 915, e.g., by reaming port 908 to remove excess material and/or by polishing the surface 910 to a desired finish.

Referring again to FIG. 8, at step 810, post-growth processing is performed. Such processing may include machining or shaping the capsule, coating the capsule, or other steps to provide a finished capsule with the desired properties; these steps may be similar to the post-growth processing steps described in Section II.A above.

It will be appreciated that the process described herein is illustrative and that variations and modifications are possible. Steps described as sequential may be executed in parallel, order of steps may be varied, steps may be modified or combined, or some steps may be omitted. For example, any of the modified and alternative processes described below may be used in place of any or all of the steps shown in process 800.

C. Additional Processes

1. Multiple Support Pins

Figure 10A:
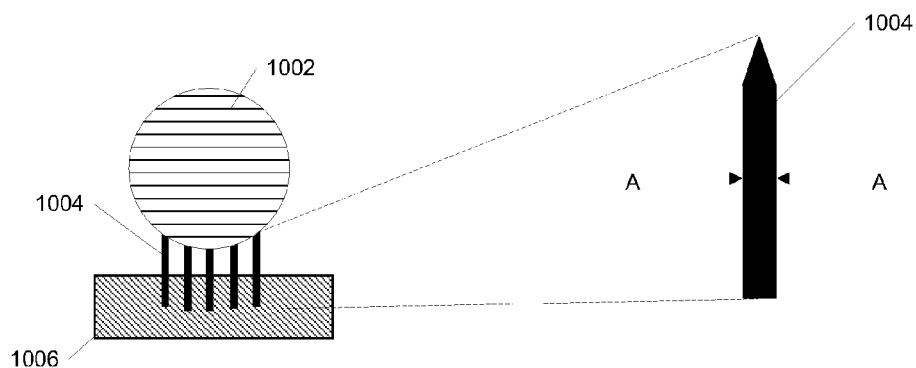
FIGS. 10A-10F illustrate a diamond capsule and support apparatus at various stages in the fabrication of a capsule according to an embodiment of the present invention.

In one modification to process 800, a form substrate may be set upon multiple support pins mounted in a base. FIGS. 10A-10E illustrate a capsule at various stages of such a manufacturing process. FIG. 10A shows a form substrate 1002 set upon multiple pins 1004 that are mounted in a base 1006. The ends of pins 1004 that contact substrate 1002 may be pointed (as shown in the enlargement at the right of FIG. 10A), flat, or concave (or convex) so as to conform to the shape of the form substrate, and the cross section of the pins along line A-A may be generally circular, rectangular, or any other desired shape.

Pins 1004 may support substrate 1002 from the bottom (as shown) or from the side, or substrate 1002 may be suspended from pins 1004 that contact substrate 1002 from above. In addition, pins 1004 may be oriented normally, obliquely, or tangentially to the surface of substrate 1002 at the point of contact.

Figures 10B, 10C:
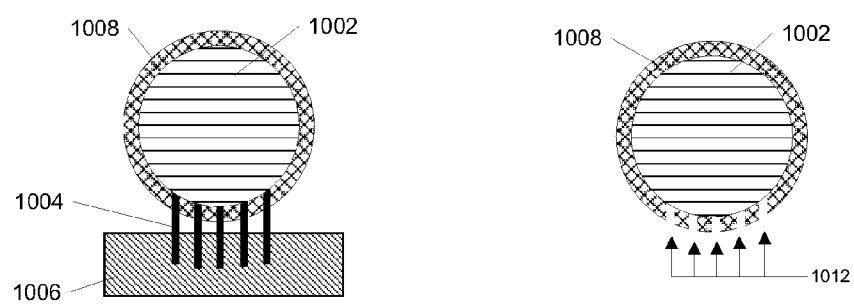
Figures 10D, 10E, 10F:
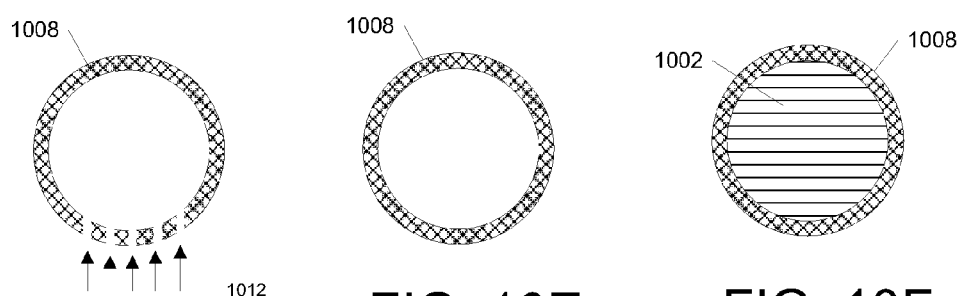

FIG. 10B shows a diamond shell 1008 grown over the form substrate 1002 while substrate 1002 remains in contact with pins 1004. FIG. 10C shows shell 1008 after its removal from pins 1004; a number of access ports 1012 through shell 1008 have been created. FIG. 10D shows shell 1008 after the removal of form substrate 1002 through access ports 1012. After removing form substrate 1002, ports 1012 may be closed, as shown in FIG. 10E, to create a hollow capsule. In an alternative embodiment, ports 1012 may be closed without removing form substrate 1002, so that the interior of the resulting capsule is filled with a solid material as shown in FIG. 10F.

2. Processing Multiple Form Substrates in Parallel

Figure 11:
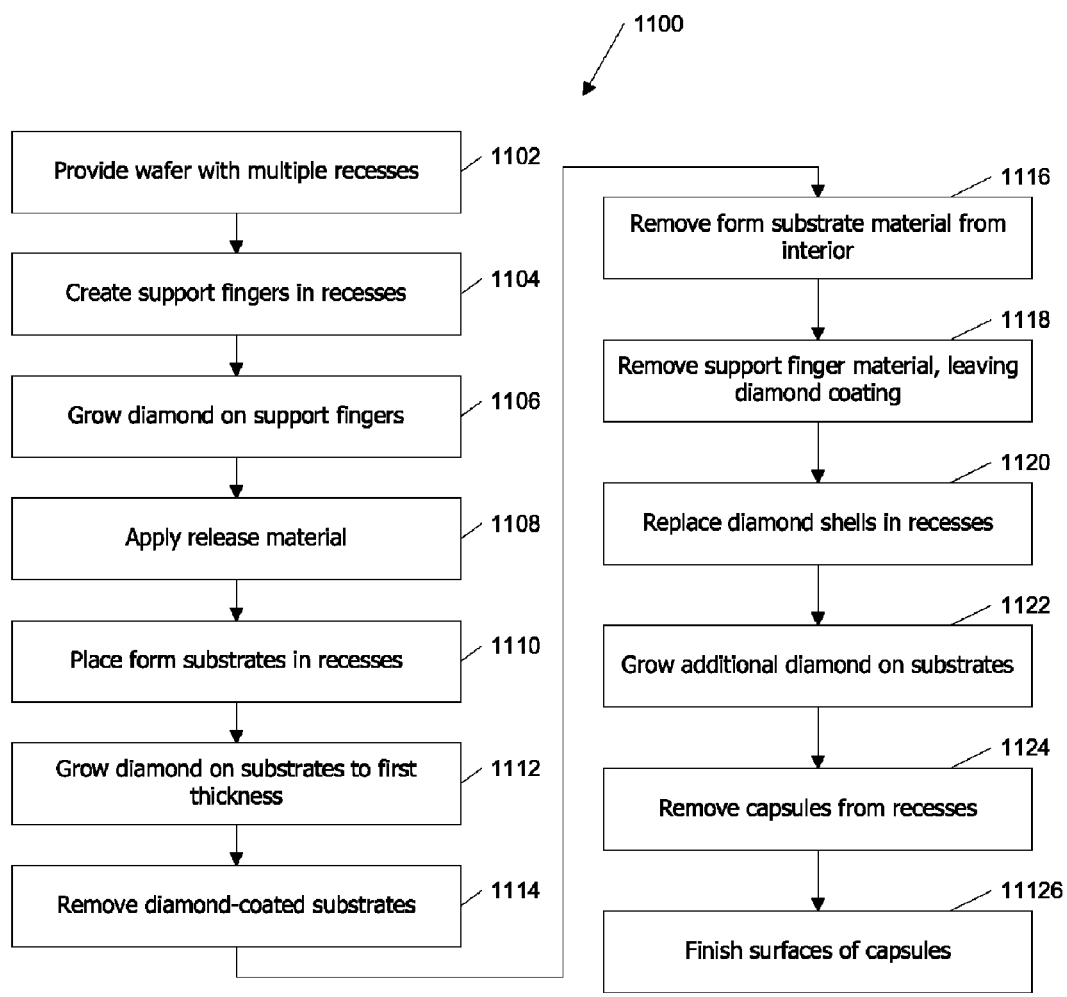
FIG. 11 is a flow diagram of a process for forming multiple diamond capsules in parallel according to an embodiment of the present invention.

In another modification, a large number of form substrates may be processed in parallel. FIG. 11 is a flow diagram of a suitable process 1100, which is a variation of process 800 described above, and FIGS. 12A-12I illustrate various stages and features of this process.

Figure 12A:
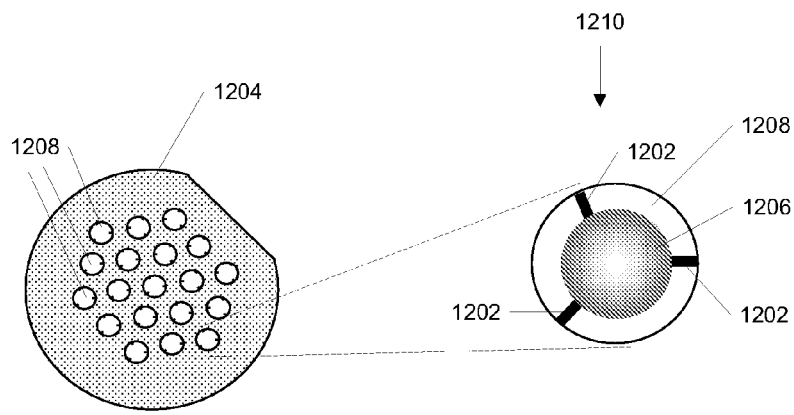
FIGS. 12A-12I are views of a diamond capsule and growth apparatus at various stages of the process of FIG. 11.

At step 1101, a number of recesses (or holes) are formed in a substrate wafer of a suitable material. For instance, FIG. 12A shows a wafer 1204 with a number of recesses 1208 formed therein. Wafer 1204 may be made of silicon, silicon carbide, sapphire or other suitable material in which recesses 1208 can be formed. Recesses or holes 1208 may be created by any process including but not limited to lithography and etching, conventional machine tools, electric discharge machining (EDM), or water jets, and each recess 1208 is advantageously made to be larger than the dimensions of a capsule to be formed therein.

At step 1102, fingers 1202 for supporting a form substrate 1206 are formed in the recesses 1208, as shown in inset 1210 of FIG. 12A, which also shows a form substrate 1206 in place in recess 1202. Fingers 1202 are advantageously made of a substrate material such as silicon nitride, silicon carbide, silicon oxide, sapphire or the like. In one embodiment, the length of fingers 1202 is at least 1.5 times the intended thickness of the capsule shell; the transverse cross-section of fingers 1202 may be rectangular with dimensions on the order of 200 µm by 0.1 µm, or approximately circular with an area of under 20 µm².

Figure 12B:
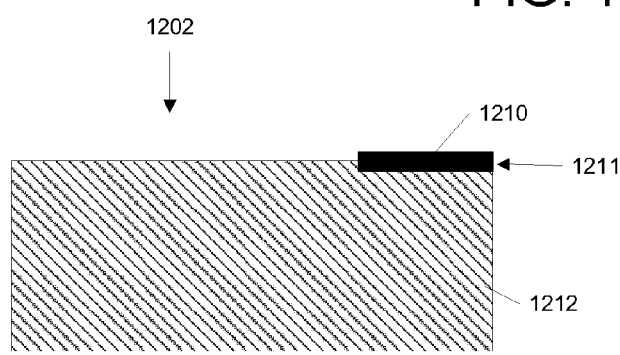
Figure 12C:
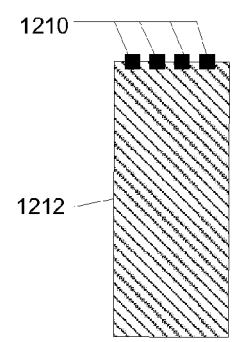

As shown in side view in FIG. 12B and end view in FIG. 12C, each finger 1202 may be made of one or more tubes 1210 on or embedded in a support structure 1212. Tubes 1210 may be hollow or solid tubes formed of silicon nitride. In some embodiments, tube 1210 is a multilayer structure, e.g., with a hollow or solid silicon nitride core surrounded by polysilicon and further surrounded by a coating of silicon nitride. In one embodiment, each tube 1210 has a rectangular cross section of about 3.5 µm by about 5 µm and is at least as long as the intended thickness of the capsule shell. Support structure 1212, which is fixed to the side of recess 1208, may be made of silicon, silicon carbide, silicon oxide, sapphire or other suitable substrate material. Tube 1210 is placed on support 1212 such that end 1211 will be in contact with form substrate 1206.

Figure 12D:
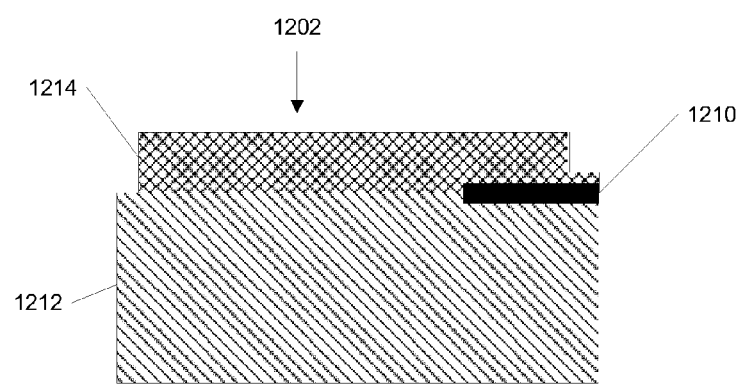

At step 1103, diamond 1214 is grown over fingers 1202, as shown in side view in FIG. 12D. At step 1104, a release material is applied to wafer 1204, including fingers 1202. Any material with low adhesion to diamond may be used as a release material; examples include tantalum nitride, silicon carbide, or the like.

Figure 12E:
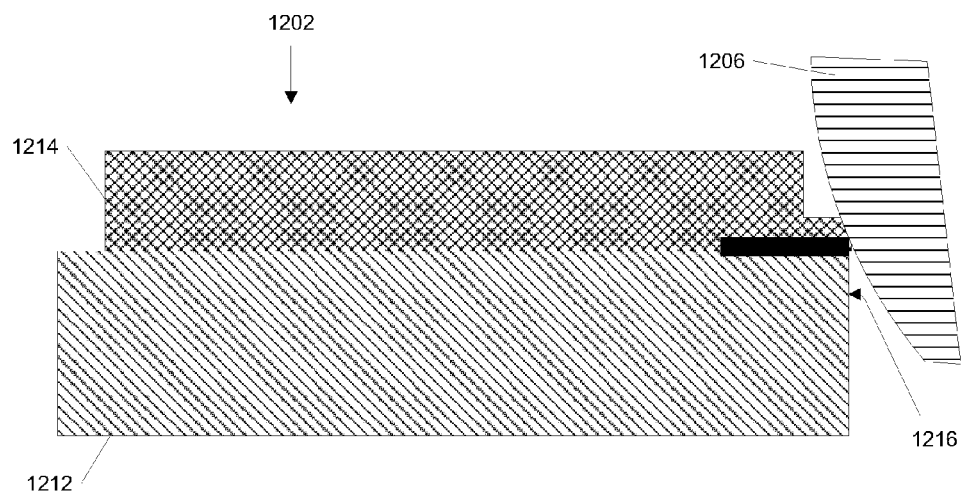

At step 1105, a spherical form substrate (or mold) 1206 is inserted into each recess 1208. Form substrates 1206 may be generally similar to the spherical form substrates described above, and may be inserted in various ways. For example, a number of forms 1206 may be rolled or shaken over wafer 1204, allowing a form 1206 to drop into each recess 1208. As shown in FIG. 12E, forms 1206 drop into recesses 1208 and contact the diamond coating 1214 of fingers 1202 at a surface 1216.

Figure 12F:
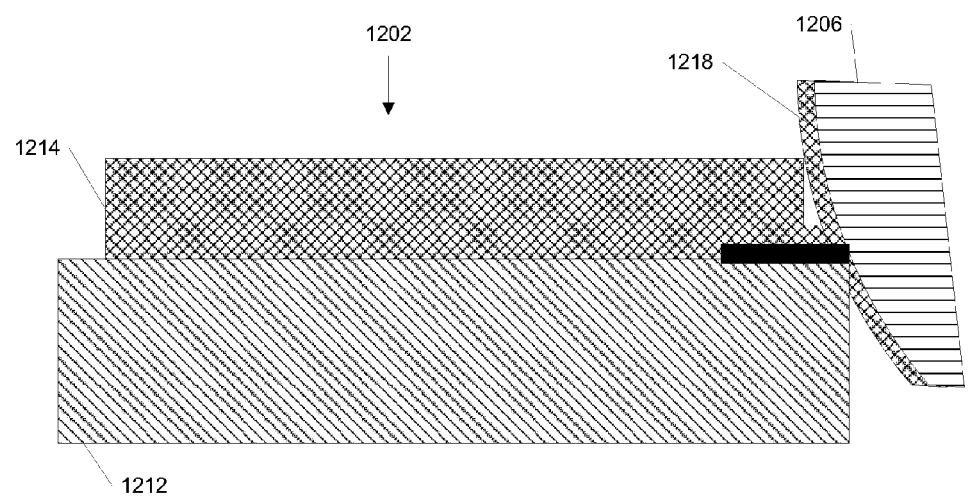

At step 1106, a diamond layer is grown on forms 1206 to a thickness less than the total desired thickness of the capsule shell but large enough to provide a shell with sufficient structural integrity and rigidity to be self-supporting. FIG. 12F shows a form 1206 with diamond 1218 grown thereon so as to form a shell. (For convenience, only a portion of shell 1218 is shown.)

At step 1108, forms 1206 with diamond shells 1218 are removed from recesses 1208; the presence of a release material between diamond finger 1214 and shell 1218 allows for easy separation of the two. During removal, the position and orientation of each shell 1218 is advantageously maintained or otherwise registered so that each shell 1218 can be returned to the same recess 1208 in the same orientation. Upon removal from recess 1208, shell 1218 has openings therein corresponding to the contact area of fingers 1202. At step 1110, form substrate 1206 is removed through these openings, e.g., using etching processes as described above, leaving hollow diamond shells 1218.

Figure 12G:
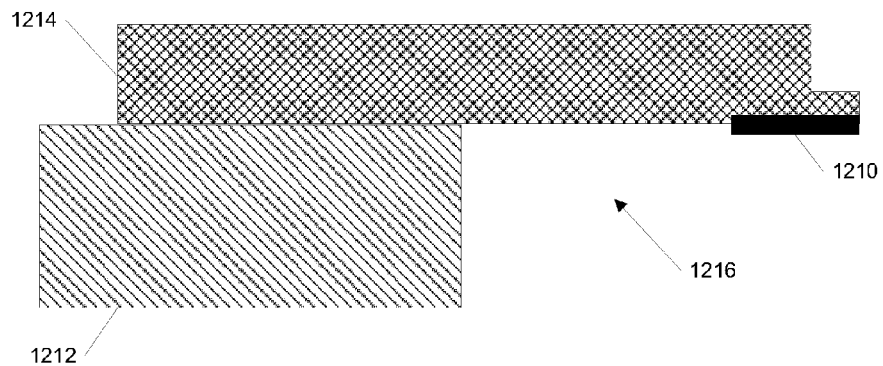

At step 1112, the support material 1212 in region 1216 of finger 1202 is removed, as shown in FIG. 12G, leaving the under side of tube 1210 exposed. Conventional etching processes may be used to remove this material. After removal of the support material 1212, tube 1210 and diamond coating 1212 remain in region 1216, which is at least as long as the intended final thickness of the diamond shell.

Figure 12H:
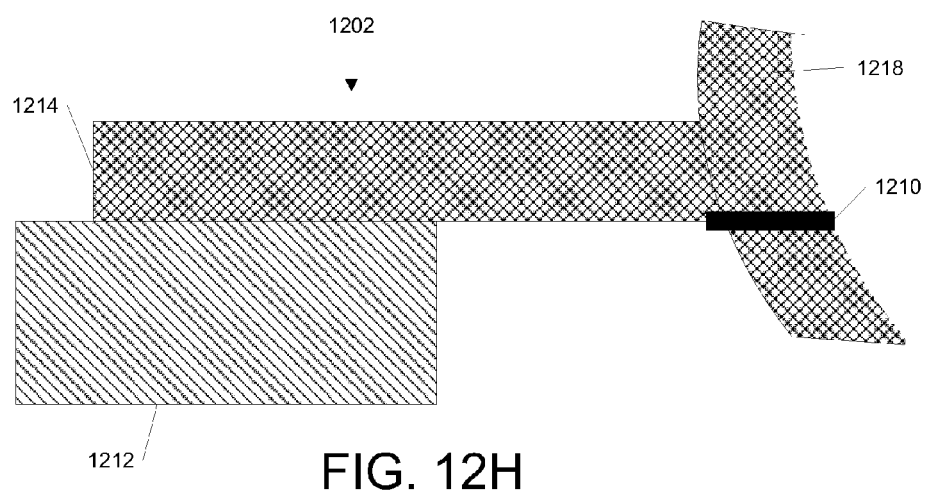

Thereafter, at step 1114, diamond shells 1218 are replaced in recesses 1208. Preferably, each shell 1218 is replaced in the same recess from which it was removed, with the same orientation relative to fingers 1202 as it previously had. At step 1116, diamond growth over shells 1218 is continued, until shells 1218 reach the desired thickness as shown in FIG. 12H.

At step 1118, shells 1218 are removed from recesses 1208; this step may involve cutting through diamond 1214, e.g., using a laser or mechanical cutting device. At step 1120, final processing (e.g., polishing and coating as described above) is performed. It should be noted that a portion of diamond coating 1214 from the finger 1202 advantageously becomes part of diamond shell 1218.

Figure 12I:
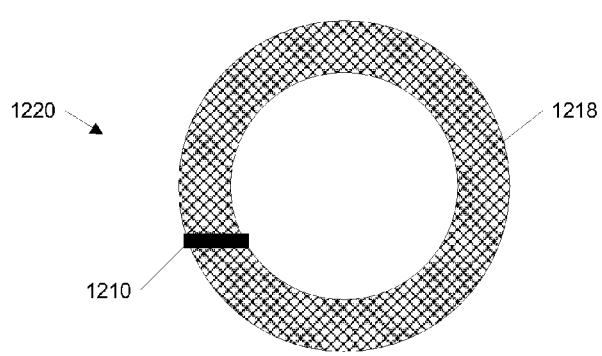

FIG. 12I shows the resulting diamond capsule 1220, in which tube member 1210 provides an access port. In some embodiments, tube member 1210 may have a hollow core; if the core is not hollow, tube member 1210 or its core may be removed, e.g., using a suitable etching process. Capsule 1220 can be filled via the access port provided by tube member 1210, which can then be closed, e.g., by filling it with additional diamond or a plug as described above.

3. Forming an Integrated Valve Structure

In other embodiments a valve can be formed integrally with the shell. The valve provides a sealable opening into the interior of the capsule through movement or deformation. In one embodiment, the valve is formed from a flap of diamond that can deform slightly under a pressure differential to seal the capsule.

Figure 13A:
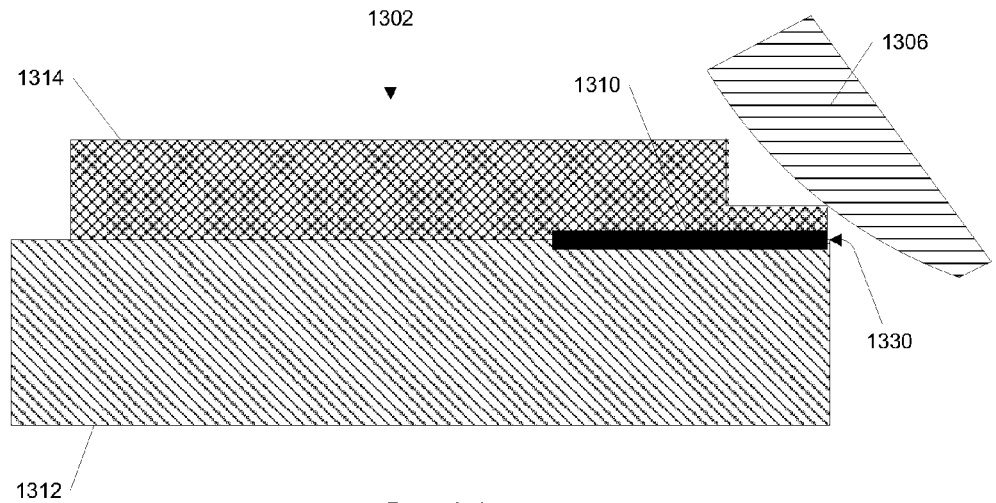
FIGS. 13A-13C are views of an access port structure with an integral valve member according to an embodiment of the present invention.

A shell with an integral valve flap can be made using a process similar to process 1100 described above with a slight modification in placement of the support fingers relative to the form substrate. FIG. 13A shows a representative finger 1302 that includes a tube member 1310 resting on a support member 1312. Finger 1302 is coated with diamond 1314. Fingers 1302 may be similar in structure and composition to fingers 1202 of FIGS. 12B-12D and may be arranged in recesses 1208 in a wafer 1204 as shown in FIG. 12A. Fingers 1302, however, are arranged to contact the surface of form substrate 1306 at a shallower angle (i.e., more nearly tangential to the surface) than that shown in FIG. 12C. Process 1100 can be used with fingers 1302 to form a shell for a capsule.

Figure 13B:
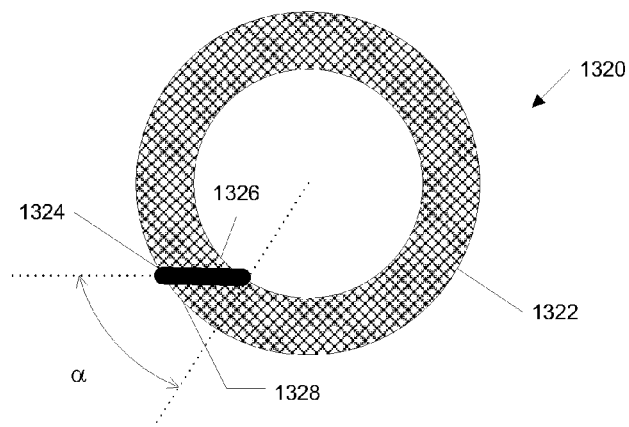

The resulting capsule 1320 is shown in FIG. 13B. Shell 1322 has an access port 1324 formed from tube member 1310 of FIG. 13A. Access port 1324 penetrates through shell 1322 at an angle α with respect to a surface normal 1326, as shown by the dotted lines. A relatively thin flap 1326 of diamond material is thereby formed. When the pressures inside and outside shell 1322 are nearly equal, flap 1326 is in its neutral position, and access port 1324 is open, allowing material to enter the shell. If the pressure inside shell 1322 exceeds the pressure outside, flap 1326 deforms outward toward member 1328, closing access port 1324. Thus, capsule 1320 can be filled with a fluid by placing capsule 1320 in a high-pressure fluid environment and allowing capsule 1320 to reach equilibrium, then quickly reducing the external pressure so that flap 1326 deforms outward, sealing the high-pressure fluid inside.

Figure 13C:
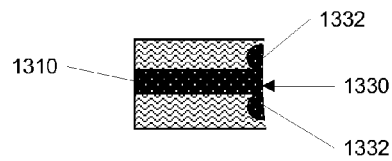

The sealing behavior of flap 1326 can be further enhanced by suitably shaping the end 1330 of tube member 1310 (FIG. 13A) that contacts form substrate 1306. For instance, FIG. 13C illustrates a tube member 1310 with flanges 1332 formed near end 1330.

Figure 14A:
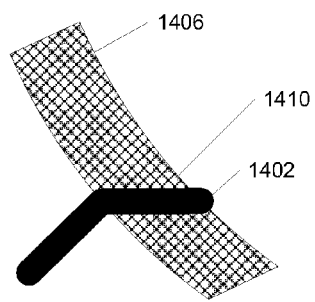
FIGS. 14A and 14B are cross-sectional views of access port structures with integral valve members according to further embodiments of the present invention.
Figure 14B:
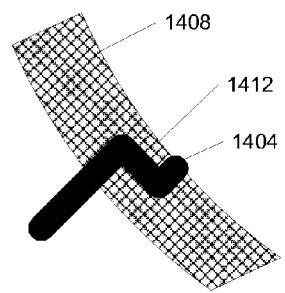

In another variation, the end of a pin used to support the form substrate is shaped such that a flap will be formed as the diamond shell is grown. FIGS. 14A and 14B illustrates examples of shaped pins 1402, 1404; sections of respective diamond shells 1406, 1408 with flaps 1410, 1412 formed around pins 1402, 1404 are shown. After the shell (1406 or 1408) is grown, pin 1402 or 1404 can be extracted or etched away to open an access port. It should be noted that shaped pins such as pins 1402, 1404 may be used to define access ports regardless of whether the shell is formed as a unit (e.g., as in process 800 of FIG. 8 described above) or in sections (e.g., as in process 500 of FIG. 5 described above).

Figure 15A:
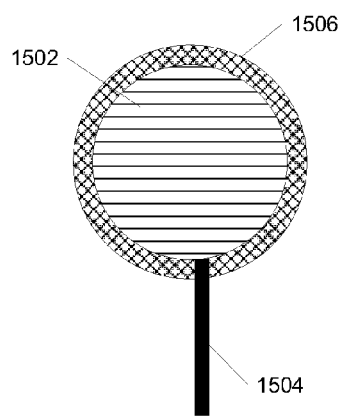
FIGS. 15A-15F are cross sectional views of capsule structures at various stages of a process for forming a capsule with an integral valve according to an embodiment of the present invention.
Figure 15B:
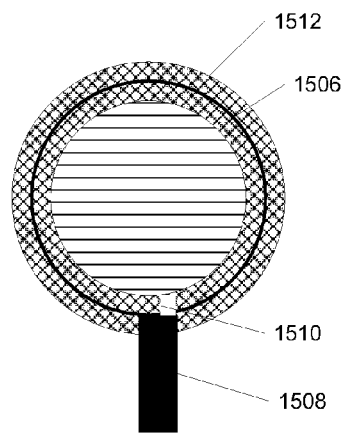

In still another embodiment, an integrated valve structure can be formed by introducing different support members at different stages in diamond growth, e.g., in a further variation of process 800 described above. FIGS. 15A-15F illustrate one suitable procedure. FIG. 15A shows a form substrate 1502, which might be, e.g., 2 mm in diameter, supported by a first support member 1504 (e.g., a pin as described above), allowing formation of a uniformly thick diamond layer 1506, which may be, e.g., 10 nm to 100 μm thick. In FIG. 15B, first support member 1504 has been removed and replaced by a second support member 1508. Second support member 1508 is advantageously large enough to cover the opening 1510 in layer 1506 that was created by removing first support member 1504 and to extend beyond opening 1510 in at least one direction. With second support member 1508 in place, a diamond layer 1512 is grown over layer 1506. The combined thickness of layers 1506 and 1512 might be, e.g., 50 μm to 100 μm.

Figure 15C:
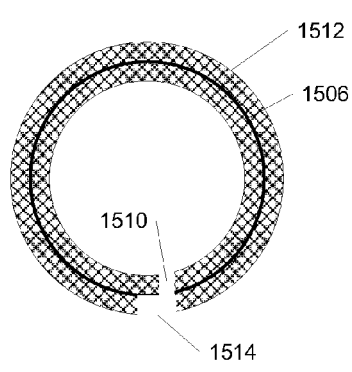
Figure 15D:
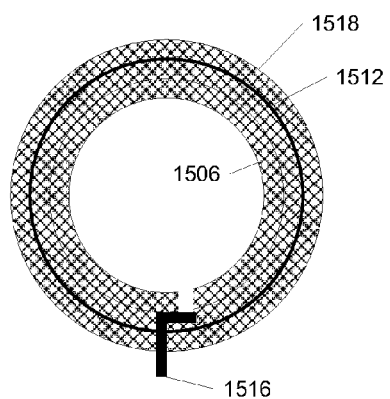
Figure 15E:
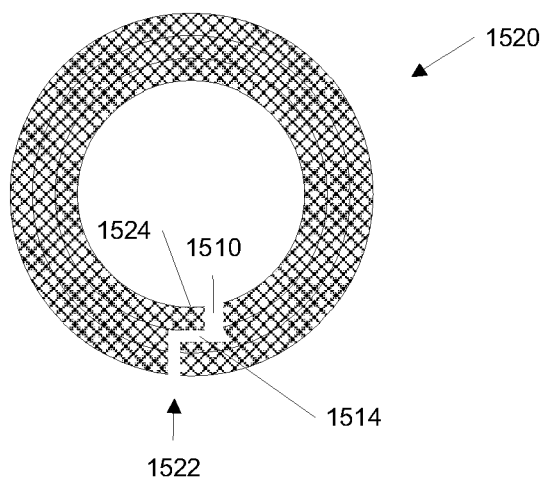
Figure 15F:
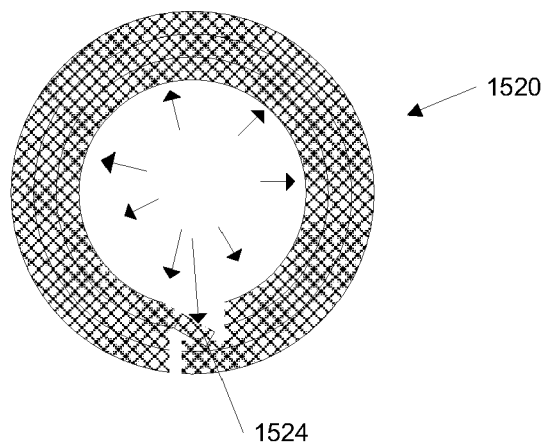

Thereafter, as shown in FIG. 15C, support member 1508 is removed, creating an opening 1514 contiguous with opening 1510. Form substrate 1502 is advantageously removed through openings 1510 and 1514, e.g., as described above in process 800. Next, as shown in FIG. 15D, a third support member 1516 is introduced, and a final diamond layer 1518 is grown. FIG. 15E shows the finished capsule 1520 after removal of support member 1516; opening 1522 created by support member 1516 is contiguous with opening 1514, creating an access port to the interior of capsule 1520. The access port includes a deformable flap 1524. As shown in FIG. 15F, when capsule 1520 is filled with a fluid at higher pressure than the external environment (pressure is indicated by the arrows), flap 1524 deforms outward, sealing capsule 1520.

In some embodiments, the access port may be used to fill capsule 1520 with a fluid at temperatures as low as a few degrees K, after which capsule 1520 and its contents are brought up to a higher temperature (e.g., room temperature, around 20 C) while opening 1522 is covered. At temperatures at which the fluid inside capsule 1520 is a gas, the high pressure (e.g., up to 500 atmospheres) pushes on diamond flap 1524 to seal capsule 1520, as depicted in FIG. 15F, and opening 1522 can be uncovered.

To provide a high-quality seal, the walls of the access port may be polished as they are formed or before the capsule is filled. Where the diamond surface of the port walls can be brought to a surface smoothness (RMS deviation) of less than 10 nm, a diamond-to-diamond seal is adequate for many applications.

In other embodiments, e.g., where the walls of the access port are not smooth surfaces, the sides of the access port may be coated with a compliant sealing material to improve the quality of the seal. Examples of compliant sealing materials include germanium, silicon, silicon nitride, silicon carbide, aluminum, antimony, bismuth, polonium, astatine, americium, platinum or gold; the coating may be 10 nm to 50 μm thick, depending on the grain size of the diamond material.

In still other embodiments, an access port with an integral valve flap may be made using focused ion beam (FIB) and/or AFM-guided nanomachining after the capsule is formed.

4. Discrete Valve Structures

In another embodiment, the valve or plug that closes the access port is a discrete structure, which may be made of diamond or other suitable material, rather than an integral part of the capsule shell.

Figure 16A:
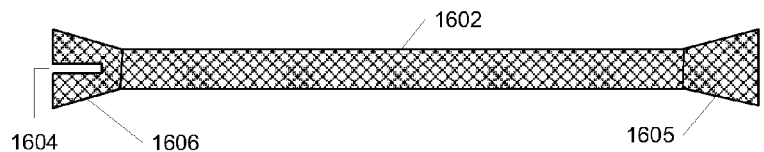
FIGS. 16A-16F are cross sectional views of a valve member for a diamond capsule according to an embodiment of the present invention.
Figure 16B:
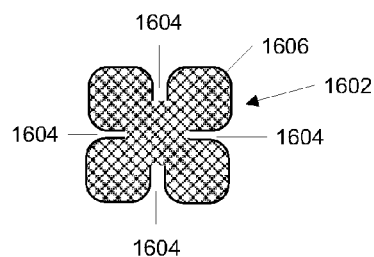

For example, FIGS. 16A and 16B are, respectively, a side view and an end view of a filament valve 1602 made of a diamond material. Filament 1602 is advantageously at least as long as the intended thickness of the capsule shell and has a tapered section 1605, 1606 at each end. Its cross section may be rectangular as shown in FIGS. 16A and 16B, round, or other shapes as desired. Slots 1604 are cut or formed in one tapered section 1606 of filament 1602.

Figure 16D:
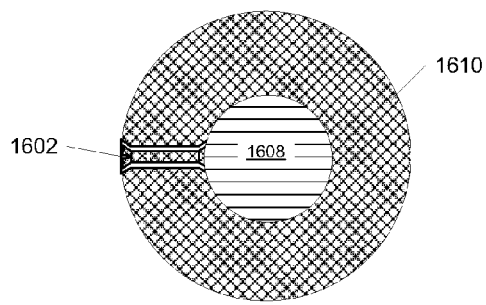
Figure 16C:
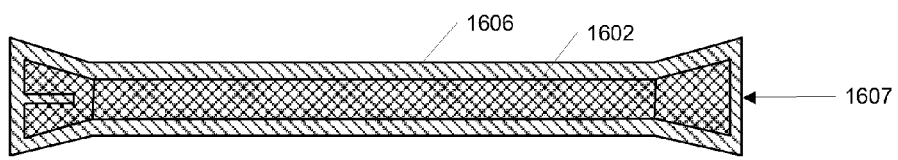

In one embodiment, shown in FIG. 16C, filament 1602 is coated with silicon nitride or other removable material 1606. As shown in cross section in FIG. 16D, the non-slotted end face 1607 of coated filament 1602 is held in contact with the surface of a form substrate 1608 while a diamond shell 1610 is formed. Shell 1610 is advantageously formed with one or more openings (other than at filament 1602) through which form substrate 1608 can be removed. After shell 1610 is formed, coating 1606 is removed (e.g., by etching), exposing filament 1602.

Figure 16E:
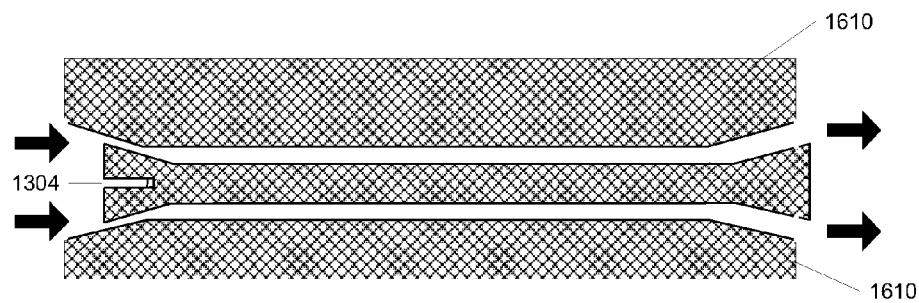

Once coating 1606 is removed, filament 1602 is operable as a valve. FIG. 16E is a cross sectional view of shell 1610 and filament 1602 in a filling arrangement. Filament 1602 is displaced inward by pressure (arrows) of a filling fluid outside the capsule. Slots 1604 in tapered section 1606 allow for deformation sufficient that the filling fluid can pass into the capsule through spaces 1612 surrounding filament 1602. In one embodiment, the capsule is filled at a low temperature as described above.

Figure 16F:
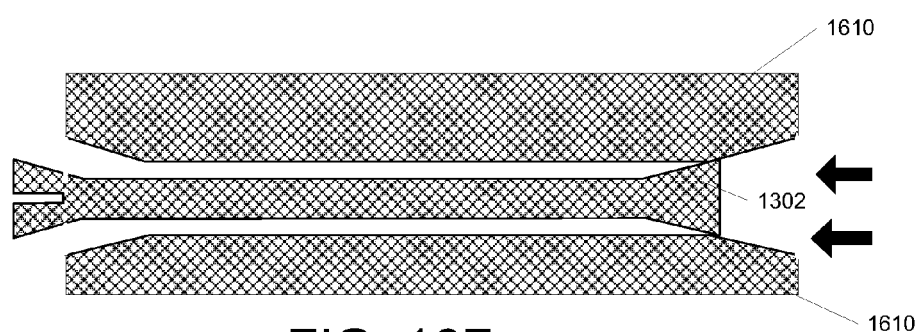

After the capsule is filled, a pressure differential between the interior and exterior of the capsule is created, e.g., by raising the temperature of the capsule, such that the fluid inside is at higher pressure than the pressure outside the capsule. As shown in FIG. 16F, the resulting outward pressure (arrows) displaces filament 1602 outward, sealing the capsule.

It is to be understood that FIGS. 16A-16F are illustrative. Valve structures may be made of diamond or any other suitable materials and may have any desired shape. Valves may open or close by displacement (e.g., as shown in FIGS. 16E and 16F), by expansion and contraction, by deformation, or by other movements.

5. Alternative Support Structures

In embodiments described above, pins, fingers or similar support structures were shown as having a relatively small area in contact with the form substrate. In other embodiments, the support structure may have a larger contact area, which can create a larger opening and provide for faster removal of the form substrate material.

Figure 17A:
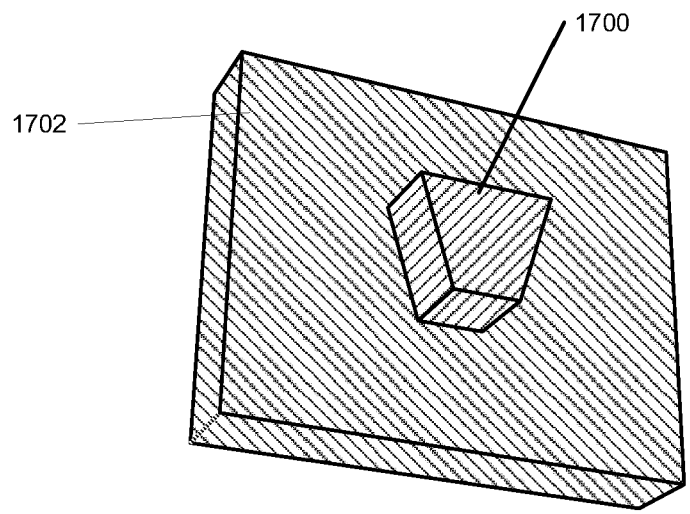
Figure 17B:
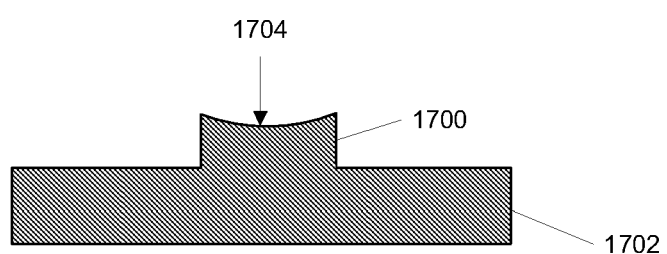

For example, FIGS. 17A and 17B are, respectively, a perspective view and a side elevation view of a pedestal 1700 on which a form substrate may be placed. Pedestal 1700, which has a trapezoidal cross section, is formed or mounted on a substrate base 1702 and, as best seen in FIG. 17B, top surface 1704 of pedestal 1700 has a concave shape with a curvature approximately matching the curvature of the form substrate (not shown in FIG. 17B) that pedestal 1700 is intended to support.

In one embodiment, pedestal 1700 can be formed in a silicon substrate 1702 using conventional MEMS techniques, followed by machining of surface 1704 to match the radius of curvature of the form substrate, then coated, e.g., with a silicon carbide or silicon nitride coating.

A form substrate (not shown in FIG. 17A or 17B) is seeded and placed on pedestal 1700, e.g., using a mounting material such as carbon dag (a suspension of fine carbon particles in ethyl alcohol, methyl alcohol or another alcohol). A diamond growth process, e.g., any of the processes described above, is used to create a diamond shell with an opening corresponding to the shape of surface 1704 of pedestal 1700. For instance, FIGS. 17C and 17D are, respectively, a side cross-sectional view and a bottom view of a shell 1706 that has been formed on a form substrate 1708 held on pedestal 1700 (not explicitly shown in FIGS. 17C and 17D). An opening 1710 corresponding to the shape of top surface 1704 of pedestal 1700 has been created. Opening 1710 is relatively large, allowing for rapid removal of form substrate 1710. At this stage, shell 1706 advantageously has a thickness less than the desired final thickness but sufficient to provide structural integrity and rigidity.

After substrate 1710 has been removed through opening 1710, it will generally be desirable to close or constrict opening 1710 to provide a more complete shell for the capsule. In one embodiment, a cap member for the capsule is created with form substrate 1708 in place. After removing the cap member and extracting form substrate 1708 the cap member is replaced and fused to the rest of shell 1706 by further diamond growth.

Formation of a cap member is illustrated in cross sectional view in FIG. 17E. Form substrate 1708 with shell 1706 formed thereon is placed in a holder 1712, with opening 1710 now oriented upward. A mask plate (or cap plate) 1714 covers most of shell 1706, leaving opening 1710 and a relatively small surrounding area exposed. To create an access port for later use in filling the capsule, a diamond stub 1716 with an internal tube member 1720, which may be similar to diamond-coated tube 1210 described above, is placed atop form substrate 1708 and held in place by a suitable support structure (not shown). The support structure may include, e.g., a suspension structure or a support member connected to mask plate 1714. The exposed area, including mask plate 1714 and opening 1710, is coated with a release material, then seeded with diamond, and further diamond growth forms a cap member 1718. Cap member 1718 may be thicker than shell 1706 but is advantageously still not as thick as the final capsule thickness.

Figure 17F:
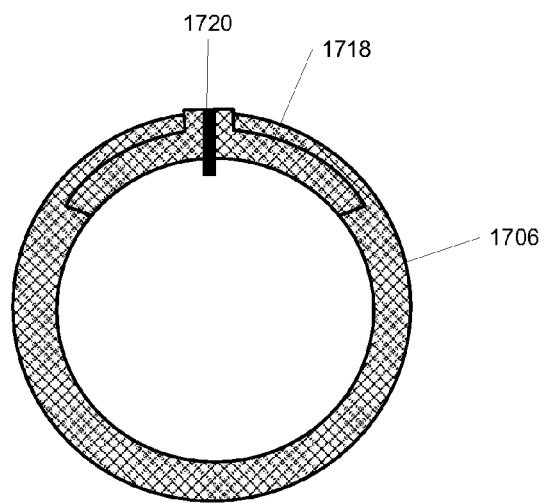

After cap member 1718 is formed, it is removed to expose opening 1710. In one embodiment, cap member 1718 can simply be pulled free due to the coating of release material between cap 1718 and the surfaces of shell 1706, form substrate 1708, and mask plate 1714. Shell 1706 is removed from holder 1712, form substrate 1708 is removed through opening 1710 and any remaining release material on shell 1706 or cap member 1718 is stripped away. Cap member 1718 is then replaced in opening 1710, and further diamond growth over shell 1706 and cap member 1718 can be performed until a desired final thickness is obtained, as shown in FIG. 17F. The capsule can be filled via an access port defined by tube member 1720.

It will be appreciated that the size and shape of the pedestal is illustrative and that other shapes may be substituted. The pedestal is advantageously shaped such that the cap member that is formed in and removed from the pedestal location can be replaced in the opening in only one orientation (as is the case for a trapezoidal shape, although other asymmetric shapes also provide this property). For example, in one embodiment, the pedestal might cover up to 50% of the surface area of the form substrate and may have an arbitrary shape. In one embodiment, the shell can be formed in two sections shaped like the flaps of a baseball, which are then attached to each other. In other embodiments, all or part of the pedestal might be replaced by a coating of a material such as tantalum nitride that inhibits diamond growth on coated portions of the form substrate.

In addition, rather than using pedestals or other masking materials to prevent shell growth over some section of the form substrate, an opening such as opening 1710 could be formed in shell 1706 after it is grown to an intermediate thickness. For example, laser cutting of the diamond material of shell 1706 could be used to create opening 1710, or opening 1710 could be created by using an $O_2$ plasma or other suitable etchant to etch away the diamond material through a suitably patterned mask applied to shell 1706.

Due in part to the larger openings, such configurations permit fast removal of the substrate, e.g., by etching, since more substrate material is exposed to the etchant at a given time. Further, in some embodiments, depending on the size and shape of the covered portion of the substrate, the substrate can be removed by slightly deforming (flexing) the shell and/or the substrate, allowing the substrate to "pop" free. Flexural removal can be practiced where the form substrate material is silicon carbide or another material with poor adhesion to diamond and where the fraction of the substrate surface area covered by the shell material is small (e.g., about 50% or less) or where the shell material is arranged so as not to require the substrate to pass through a constricted opening, as in the case of the hemispherical shell sections described in Section II.A above or in the case of a "baseball flap" shell.

6. Filling Capsules with Solid Materials

In some embodiments, it is desirable to fill a capsule with a solid material other than the form substrate material. Where the capsule is formed in sections, an arbitrary solid material can be enclosed in the capsule when the sections are joined. Where the capsule is formed as a unitary structure, a solid filling material can be introduced by filling a hollow capsule in an environment in which the material is in a fluid state (liquid or gas), then cooling the capsule to solidify the material.

Figure 18:
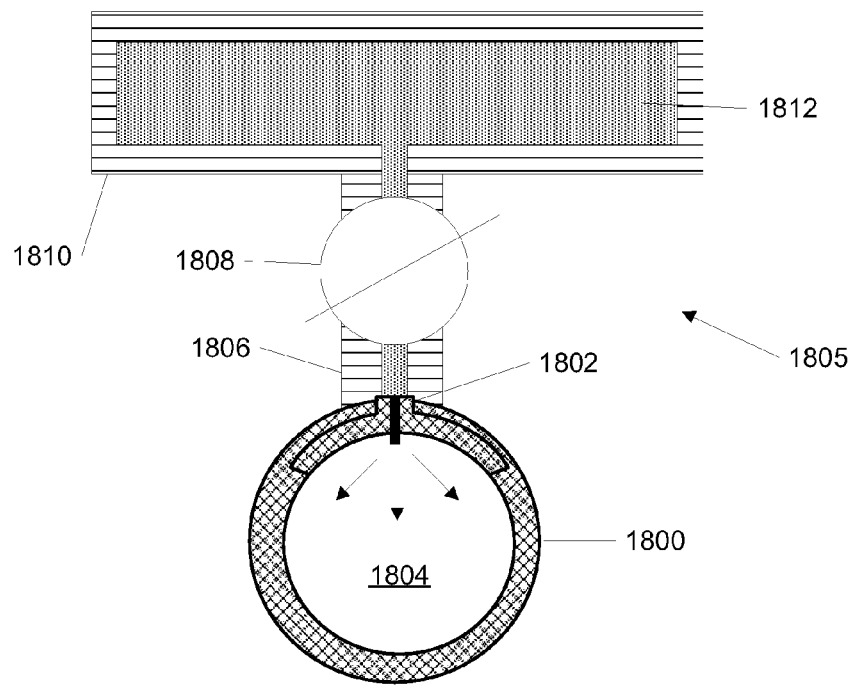
FIG. 18 is a cross-sectional view of a filling assembly for filling a capsule that has an access port according to an embodiment of the present invention.

For example, FIG. 18 is a cross sectional view showing a filling assembly 1805 for filling a capsule 1800 that has an access port 1802 according to an embodiment of the present invention. Capsule 1800 is first brought to a desired filling temperature in a vacuum environment so that the interior 1804 is empty. The filling temperature may be any temperature at which the filling material is in a fluid state. A filling assembly 1805 that includes a fill tube 1806, a fill valve 1808, and a fluid reservoir 1810 is connected to access port 1802, either before or after capsule 1800 is brought to the filling temperature. Fill tube 1806 is advantageously designed to make a good seal against capsule 1800 in the area of access port 1802 so that minimal fluid escapes during filling. Fluid reservoir 1810 contains the filling material 1812 in a fluid state. Fill valve 1806 controls the flow of fluid through fill tube 1806.

Once fill tube 1806 is in place, the environment can be pressurized to enhance the seal between fill tube 1806 and capsule 1800. Fill valve 1808 is then opened, and a desired quantity of the fluid filling material 1812 is released into capsule 1800. To control the quantity of fluid delivered to capsule 1800, fill valve assembly 1808 may contain a meter, or the amount of fluid present in reservoir 1810 may be controlled, or other techniques may be used. Once the desired quantity of fluid has been delivered, fill valve assembly 1808 is closed, and capsule 1800 is cooled to a temperature at which the filling material 1810 solidifies. Access port 1802 may then be closed using techniques described above (e.g., filling with material, inserting a plug, or the like). Alternatively, access port 1802 can be left open in embodiments where capsule 1800 is maintained at a sufficiently low temperature and high pressure that the filling material 1810 is not lost through melting or sublimation.

7. Diffusion Techniques for Filling Capsules

In other embodiments, the interior of a capsule may be filled by diffusion of a fluid through the shell, without an access port being provided. Diffusion techniques are useful where the fluid is made of small atoms, small ions or small molecules (such as hydrogen atoms or hydrogen ions) that are capable of diffusing through the interstices of the diamond lattice. The capsule is placed into an environment containing the fluid at an appropriate temperature and pressure and allowed to reach an equilibrium state in which as many atoms are diffusing out as are diffusing in, then removed from that environment to a different environment.

In preferred embodiments, the filling temperature is higher than an ambient temperature at which the capsule is to be used; with the atomic lattice expanded at high temperature, the high pressure fluid will diffuse through the shell with relative ease until equilibrium is reached. Once the capsule is returned to ambient conditions, the lattice will contract in the cooler temperature, so that diffusive leakage will be relatively minor.

The process can be controlled by choosing the fluid pressure, the temperature and the time period during which the diffusive transfer of the fluid takes place. The spacing of atoms in the diamond lattice will generally be different for different atoms; accordingly, the range of atoms or molecules that can be diffused into the interior of the shell, as the spacing between atoms depends upon the type of atoms in the diamond lattice.

Those of ordinary skill in the art will recognize that the technique of filling a capsule by diffusion is also applicable to capsules that do not have a diamond lattice structure. Atoms or molecules of a fluid can diffuse through a shell having any atomic lattice as long as the lattice spacing is large enough to accommodate the fluid atoms or molecules, and the diffusion rate will depend on the size of the fluid atoms or molecules, the lattice spacing, and the thickness of the shell. For example, atoms or molecules of a fluid can be diffused into fullerenes, nanotubes, and other nanoscale shells.

8. Forming Non-Spherical Capsules

The manufacturing processes described above refer specifically to spherical diamond capsules. The invention, however, is not limited to making spherical capsules. Those skilled in the art will recognize that other shapes could be substituted for the spherical molds and form substrates shown and described herein, and that a diamond shell will generally have a shape conforming to the surface on which it was grown. For example, cylindrical capsules could be grown on a cylindrical form substrate or in a mold having half-cylindrical depressions or protrusions. Similarly, elliptical capsules, polyhedral capsules, or capsules having more complex shapes could be grown by providing suitably shaped form substrates or molds.

In one embodiment, geared bearing 402 (FIG. 4A) or other structures with gear-toothed or arbitrarily shaped surfaces can be made via diamond growth on forms made from any suitable material on which diamond may be grown. Examples of suitable materials and growth processes have previously been described. To make the bearing shown in FIG. 4A, surfaces of the various forms can be shaped prior to diamond growth to provide gear-like teeth or other protrusions or indentations on the diamond surface as desired. It will be appreciated that particular characteristics such as the number, sizes, and shapes of the teeth or other protrusions or indentations may be varied as desired and that the invention is not limited to the particular configuration shown. Indeed, aspects of the invention provide for growth of diamond on molds or forms of arbitrary shape, not limited to generally spherical or cylindrical shapes. For example, outer race 404 and/or inner race 406 could also be formed using techniques similar to those described herein.

III. CONCLUSION

While the invention has been described with respect to specific embodiments, one skilled in the art will recognize that numerous modifications are possible. One skilled in the art will also recognize that the invention provides a number of advantageous techniques, tools and products, usable individually or in various combinations. These techniques, tools, and products include but are not limited to:

Formation of a sphere, capsule or pellet using any or all of the following: (a) molding or form coating of CVD or PECVD diamond to form parts of a capsule or pellet; (b) construction of a sphere by the accumulation of polycrystalline, stress relieved amorphous or homeoepitaxial diamond; (c) construction of a hollow sphere by the accumulation of polycrystalline, stress relieved amorphous or homeoepitaxial diamond; (d) construction of a sphere by the accumulation of polycrystalline, or homeoepitaxial silicon carbide; and (e) construction of a hollow sphere by the accumulation of polycrystalline, or homeoepitaxial silicon carbide; and/or a sphere, capsule or pellet where the inner surface is smoothed by the form or mold; and/or a sphere, capsule or pellet where the form or mold is used as a support and/or holder to complete modifications of and additions to the outer surface; and/or a sphere, capsule or pellet in which the outer surface is smoothed by the mold or form; and/or a sphere, capsule or pellet in which the form or mold is used as a support and/or holder to complete modifications of and additions to the inner surface; and/or assembly of a capsule using interference fits, locking clips or any structure molded, formed or machined into sections of the diamond shell; and/or assembly of capsules using an adhesion layer on the diamond plus other materials to bond the sections of the capsule; and/or assembly of capsules using an inert gas solid at temperatures below the inert gas melting point; and/or use of inert gases at very low temperatures as adhesives or agents for molding fixtures or structures of any kind; and/or a technique for making diamond parts in which two diamond pieces grown using a form or mold are joined together so their formed or molded surfaces and finishes are effective surfaces and finishes of the diamond part; and/or a hollow precision sphere or other shape formed by growing diamond on a ball form made or coated by any of silicon, silicon dioxide (including quartz), silicon carbide, silicon nitride, titanium, titanium carbide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, a suitable glass, aluminum oxide (including alumina) or any material on which diamond can be grown, where after growth the interior material is etched out through one or more openings or holes in the diamond material; and/or a diamond sphere grown on a form or mold in which the diamond coated ball is processed to external dimensions and finishes of any given precision; and/or a diamond sphere grown on a form or mold in which the interior form is left intact and the ball functions as a precision diamond coated ball bearing; and/or a diamond sphere formed by a growth process in which the ball form is rotated during diamond growth to promote even coating of the form with the diamond film; and/or a diamond sphere formed by a process in which a hollowed diamond sphere with one or more openings is returned to the growth environment and diamond is grown until the sphere is complete (without any openings) to obtain a continuous hollow diamond sphere; and/or processing a surface of a hollow diamond sphere to any degree of precision to obtain a precise hollow diamond spherical ball bearing; and/or a closed shape made of diamond grown on a seeded material that is able to mechanically support the diamond material; and/or a closed shape made of diamond grown on seeded substrate material that is supported by support structures to promote growth of diamond material over the entire structure except in the vicinity of the support(s), where the substrate material can be removed mechanically or by an etchant; and/or a closed shape made of diamond grown on substrate material supported by support structures in which the support holes are reduced in size by additional diamond growth to 5 micron or less openings; and/or a closed shape made of diamond grown on substrate material supported by support structures in which the diamond has been partially or fully boron doped and in which the shape is electrically charged such that in the region around the holes diamond growth is promoted while elsewhere it is inhibited; and/or a closed shape made of diamond grown on substrate material supported by support structures in which the diamond has been partially or fully boron doped and in which the shape is charged so as to promote growth everywhere except in the holes; and/or a closed shape as described above in which a mechanical means, magnetic field means or chemical means prevents the growth of boron doped diamond around the holes; and/or a closed shape as described above in which the boron is removed by chemical or mechanical means after the shape is coated with the boron coating; and/or a closed shape made of diamond with an electrically conductive additive, in which the electrically conductive additive to the diamond is nitrogen; and/or a closed shape made of diamond with an electrically conductive additive, in which the electrically conductive additive is any suitable conductivity inducing material, including various forms of carbon; and/or a shell such as described above in which the coating built up to compose the shell is boron carbide and/or boron nitride and/or silicon carbide and/or silicon nitride and/or tantalum carbide and/or tantalum nitride and/or tungsten carbide and/or tungsten nitride and/or any other obdurate material capable of being formed to extremely high finishes and tolerances; and/or a shell such as described above in which the holes are narrowed by the control of growth temperature and heat applied to the shell; and/or a shell such as described above in which the holes are narrowed to a diameter of 5 microns or less along some portion of their length; and/or any machined, molded or formed plug used to plug up the holes created in the grown diamond shell; and/or a process of building a rough mold or form out of alumina or quartz, then putting an appropriate hard film on the formed alumina or quartz, followed by further lapping and polishing to bring this surface to a desired accuracy and resolution for purposes of growing a diamond shell, where holes to the hard inner film or to the alumina or quartz are preserved during diamond growth, and after diamond growth etching is used to remove the alumina or quartz while other etch means (e.g., a dry etch) are used to remove other coatings such as silicon nitride or silicon carbide; and/or a hollow diamond shell as described herein in which the holes through which the shell's interior was etched are grown closed in an atmosphere of a high pressure fluid (liquid or gas), capturing the high pressure fluid in the interior of the shell; and/or a hollow diamond shell as described herein, in which very small holes are made in the sphere by any means including laser, or femtolaser machining, conventional machining or AFM guided nanomachining; and/or a hollow diamond shell filled with high-pressure fluid, where the high pressure is at least 500 atmospheres or more; and/or a hollow diamond capsule filled with high-pressure fluid, in which the hollow diamond capsule is less then 20 microns in diameter; and/or a hollow diamond capsule filled with high-pressure fluid in which the capsule is greater then 20 microns in diameter; and/or a diamond structure coated with silicon carbide, either directly or over an intervening layer; and/or a diamond structure coated with any or all of silicon carbide, silicon, silicon dioxide (quartz), silicon fluoride, magnesium fluoride, silicon nitride, titanium, titanium dioxide, carbide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, chromium oxide, or aluminum oxide; and/or any diamond structures which are stabilized and strengthened by being layered or incorporated into layers of silicon carbide; and/or any device, structure or mechanism composed in whole or part of diamond stabilized by silicon carbide and/or coated with layers in any order consisting of any or all of silicon carbide, silicon, silicon fluoride, magnesium fluoride, silicon nitride, titanium, titanium dioxide, carbide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, chromium oxide, aluminum oxide, or any stable oxide, any stable fluoride, or any stable nitride; and/or a fluid-containing diamond capsule with a mechanism to allow only one way flow into the capsule; and/or a valve for a diamond capsule using a double tapered single crystal diamond structure; and/or a vacuum or other arc system used to coat silicon carbide, silicon, silicon dioxide (including quartz), silicon fluoride, magnesium fluoride, silicon nitride, titanium, titanium dioxide, carbide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, chromium oxide, aluminum oxide (including alumina), oxide, carbide, nitride, fluoride, a suitable glass, or other suitable material at or near absolute zero; and/or a vacuum or other arc system used to coat silicon carbide, silicon, silicon dioxide (including quartz), silicon fluoride, magnesium fluoride, silicon nitride, titanium, titanium dioxide, carbide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, chromium oxide, aluminum oxide (including alumina), oxide, carbide, nitride, fluoride, a suitable glass, or other suitable material at or near 1000 degrees C.; and/or a vacuum or other arc system used to coat silicon carbide, silicon, silicon dioxide (including quartz), silicon fluoride, magnesium fluoride, silicon nitride, titanium, titanium dioxide, carbide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, chromium oxide, aluminum oxide (including alumina), oxide, carbide, nitride, fluoride, a suitable glass, or other suitable material at any temperature between near absolute zero and 1000 degrees C.; and/or a solid or hollow diamond structure in which the shape is obtained in whole or in part by direct machining or lapping; and/or a diamond part, including hollow diamond spheres and diamond spheres with cores, in which the diamond mass and shape are the principal mechanical, electrical, optical and/or thermal load bearing members of the part; and/or a diamond part, including diamond spheres with cores, in which the structural diamond is engineered to engage a core material by deformation when a load limit is reached; and/or a mold or form etch using any acid including hydrofluoric, aqua regia, and phosphoric acids; and/or a mold or form etch using any base including NaOH, KOH, the latter materials in solution; and/or a mold or form etch using a reactive chemically specific plasma such as $CH_6$; and/or a diamond growth process wherein the part on which diamond is being grown is intermittently moved to permit even growth over all the target surfaces of the part; and/or a coating process wherein the part on which the coating is being grown is intermittently moved to permit even growth over all the target surfaces of the part; and/or a process for growing diamond on a form in which the form material is itself sufficient to obtain the surface finish of the end product diamond structure; and/or diffusion control of fluid atoms or molecules to increase or decrease the amount of such material inside a diamond form; and/or diffusion control of fluid atoms or molecules into a diamond form that includes carbon and any other material or combination of materials; and/or diffusion control of fluid atoms or molecules into a diamond form in which the diamond material is polycrystalline diamond with single or multiple crystal sizes from 100 nm to 4 or 5 angstroms; and/or a precision bearing with a gear-like coupling surface, said bearing made substantially of diamond; and/or a process for growing diamond on an elongated gear shaped bearing form made of or coated by any of silicon, silicon dioxide (including quartz), silicon carbide, silicon nitride, titanium, titanium carbide, titanium nitride, tantalum, tantalum carbide, tantalum nitride, molybdenum, molybdenum carbide, molybdenum nitride, tungsten, tungsten carbide, tungsten nitride, boron carbide, boron nitride, chromium, chromium carbide, chromium nitride, aluminum oxide (including alumina), a suitable glass, or any material on which diamond can be grown, where after growth the interior material is etched out through one or more openings or holes in the diamond material; and/or an outer bearing race form whose interior surface is a gear like form made of polycrystalline diamond; and/or an inner bearing race form whose outer surface is a gear like form made of polycrystalline diamond; and/or a bearing form in the shape of an elongated or cylindrical gear made of polycrystalline diamond.

Thus, although the invention has been described with respect to specific embodiments, it will be appreciated that the invention is intended to cover all modifications and equivalents within the scope of the following claims.

What is claimed is:

1. A method for making a capsule, the method comprising:
growing a substantially spherical shell of a diamond lattice material over a spherical form substrate such that the shell covers all of the form substrate, wherein local deviations from smoothness on an outer surface of the form substrate are less than about 4 nm;

after growing the substantially spherical shell:
    forming an opening through the shell,
    removing the form substrate through the opening, and
    closing the opening with diamond lattice material;
forming an access port through the shell;
filling the capsule with a fluid via the access port, wherein filling the capsule includes:
    placing the capsule into an environment containing the fluid at a high pressure; and
    allowing a pressure equilibrium to be reached between the capsule and the environment; and
after the pressure equilibrium is reached, filling in the access port while maintaining the environment at a lower pressure than the high pressure.

2. The method of claim 1 wherein the diamond lattice material is a polycrystalline or nanocrystalline diamond material.

3. The method of claim 1 further comprising:
machining, chemically modifying, polishing, lapping, or grinding a surface of the form substrate prior to growing said substantially spherical shell of a diamond lattice material.

4. The method of claim 1 further comprising:
machining, chemically modifying, polishing, lapping, or grinding a surface of the shell after growing said substantially spherical shell of a diamond lattice material.

5. The method of claim 1 wherein the opening comprises at most 50% of the shell area.

6. The method of claim 1 wherein the form substrate is made of silicon.

7. The method of claim 1 wherein the act of filling in the access port includes:
    charging at least a portion of a surface defining the access port relative to the rest of the capsule such that diamond lattice material growth in the access port is promoted; and
    growing the diamond lattice material in the access port.

8. The method of claim 7 further comprising:
adding a dopant into at least a portion of the shell,
wherein the act of charging includes charging the portion of the shell where the dopant was added.

9. The method of claim 1 further comprising:
during the growth of said substantially spherical shell of a diamond lattice material, moving the form substrate so as to obtain even growth of the diamond material over the entire surface of the form substrate.

10. The method of claim 9 wherein moving the form substrate includes moving the form substrate intermittently.

11. The method of claim 9 wherein moving the form substrate includes rolling the form substrate in a rotary track.

12. The method of claim 11 wherein moving the form substrate includes keeping the form substrate in motion continuously.

13. A method for making a capsule, the method comprising:
    growing a substantially spherical shell of a diamond lattice material over a spherical form substrate such that the shell covers all of the form substrate, wherein local deviations from smoothness on an outer surface of the form substrate are less than about 4 nm;
    after growing the substantially spherical shell:
        forming an opening through the shell,
        removing the form substrate through the opening, and
        closing the opening with diamond lattice material;
    forming an access port through the shell; and
    filling the capsule with a fluid via the access port, wherein the capsule is filled with the fluid at a first temperature, and
    after filling the capsule with the fluid, reducing the temperature of the capsule to a temperature at which the fluid solidifies.

14. A method for making a capsule, the method comprising:
    growing a substantially spherical shell of a diamond lattice material over a spherical form substrate such that the shell covers all of the form substrate, wherein local deviations from smoothness on an outer surface of the form substrate are less than about 4 nm;
    after growing the substantially spherical shell:
        forming an opening through the shell,
        removing the form substrate through the opening, and
        closing the opening with diamond lattice material,
    forming an access port through the shell;
    filling the capsule with a fluid via the access port; and
    after filling the capsule with fluid, closing the access port.

15. The method of claim 14 wherein closing the access port includes inserting a plug made of the diamond lattice material into the access port.

16. The method of claim 14 further comprising:
    forming a valve member operable to open or close the access port.

17. The method of claim 16 further comprising:
    filling the capsule with fluid via the access port by placing the capsule into an environment containing the fluid at a high pressure and allowing a pressure equilibrium to be reached between the capsule and the environment; and
    after the pressure equilibrium is reached, modifying the capsule environment such that the pressure of the fluid on the valve member closes the access port.

* * * * *